United States Patent
Shakhnovich et al.

(10) Patent No.: US 7,947,761 B2
(45) Date of Patent: May 24, 2011

(54) INKJET INK COMPOSITIONS COMPRISING POLYMERIC DISPERSANTS HAVING ATTACHED CHROMOPHORE GROUPS

(75) Inventors: Alexander I. Shakhnovich, Westford, MA (US); Darryl S. Williams, Groton, MA (US); Joseph B. Carroll, Bradford, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 11/700,413

(22) Filed: Jan. 31, 2007

(65) Prior Publication Data

US 2007/0179213 A1    Aug. 2, 2007

Related U.S. Application Data

(60) Provisional application No. 60/763,548, filed on Jan. 31, 2006.

(51) Int. Cl.
| | | |
|---|---|---|
| *C09D 11/00* | (2006.01) | |
| *C08K 9/00* | (2006.01) | |
| *C08G 67/02* | (2006.01) | |
| *C08K 5/34* | (2006.01) | |

(52) U.S. Cl. ............ 523/160; 523/200; 524/88; 524/90; 524/612

(58) Field of Classification Search ................... 523/160, 523/161, 200; 106/31.6, 31.59, 31.85, 31.57, 106/31.9, 31.27; 524/88, 90, 612
See application file for complete search history.

(56) References Cited

U.S. PATENT DOCUMENTS

| | | | |
|---|---|---|---|
| 3,334,102 A * | 8/1967 | Aldridge et al. ............... 546/70 |
| 4,221,606 A * | 9/1980 | Funatsu et al. ................ 106/411 |
| 4,561,899 A | 12/1985 | Matrick | |
| 4,692,189 A * | 9/1987 | Babler et al. .................. 106/494 |
| 5,368,641 A * | 11/1994 | Dietz et al. .................... 106/495 |
| 5,713,993 A * | 2/1998 | Grezzo Page et al. ..... 106/31.85 |
| 5,716,435 A | 2/1998 | Aida et al. | |
| 5,750,323 A | 5/1998 | Scaringe et al. | |
| 5,879,439 A * | 3/1999 | Nagai et al. ................. 106/31.28 |
| 6,150,433 A * | 11/2000 | Tsang et al. .................... 523/160 |
| 6,494,943 B1 | 12/2002 | Yu et al. | |
| 7,223,302 B2 | 5/2007 | Shakhnovich | |
| 7,377,974 B2 | 5/2008 | Grimm et al. | |
| 2002/0147252 A1 | 10/2002 | Adams | |
| 2003/0097958 A1* | 5/2003 | Yu et al. ........................ 106/31.6 |
| 2004/0138434 A1* | 7/2004 | Takahara et al. ............... 534/630 |
| 2004/0227800 A1* | 11/2004 | Ohira et al. ..................... 347/100 |
| 2005/0124727 A1* | 6/2005 | Huber et al. .................... 523/160 |
| 2007/0179213 A1 | 8/2007 | Shakhnovich et al. | |
| 2007/0179214 A1 | 8/2007 | Shakhnovich et al. | |
| 2008/0207803 A1 | 8/2008 | Loccufier et al. | |
| 2008/0214705 A1 | 9/2008 | Deroover et al. | |
| 2008/0227894 A1 | 9/2008 | Loccufier et al. | |
| 2008/0242776 A1 | 10/2008 | Jaunky et al. | |
| 2009/0005474 A1 | 1/2009 | Jaunky et al. | |

FOREIGN PATENT DOCUMENTS

| | | | |
|---|---|---|---|
| GB | 2036779 A | | 7/1980 |
| JP | 57126856 | * | 8/1982 |
| JP | 10130554 | | 5/1998 |
| WO | WO 2007/006634 | | 1/2007 |
| WO | WO 2007/006635 | | 1/2007 |
| WO | WO 2007/006637 | | 1/2007 |
| WO | WO 2007/006638 | | 1/2007 |
| WO | WO 2007/006639 | | 1/2007 |

OTHER PUBLICATIONS

Derwent English language Abstract of JP 57126856 by Abe et al.*
English language translation of JP 5712268856 pp. 16.*
STN Search Report pp. 16.*
International Preliminary Report on Patentablity for International Application No. PCT/US2007/002678, mailed Aug. 14, 2008.
JP 63-175080 to Dainippon Ink & Chemical Inc. (Jul. 19, 1988)—Abstract only.
JP 04-139262 to Dainippon Ink & Chemical Inc. (May 13, 1992)—Abstract only.
JP 06-065521 to Dainippon Ink & Chemical Inc. (Mar. 8, 1994)—Abstract only.
JP 07-041689 to Dainippon Ink & Chemical Inc. (Feb. 10, 1995)—Abstract only.
JP 2005-255950 to Fuji Photo Film Co. Ltd. (Sep. 22, 2005)—Abstract only.
JP 2005-255951 to Fuji Photo Film Co. Ltd. (Sep. 22, 2005)—Abstract only.

* cited by examiner

*Primary Examiner* — Basia Ridley
*Assistant Examiner* — Alexander C Kollias

(57) ABSTRACT

The present invention relates to an inkjet ink composition comprising a liquid vehicle, a pigment, and a polymeric dispersant. In one embodiment, the pigment comprises a colorant having the formula $A\text{-}(B)_x$ or is a carbon black pigment and the polymeric dispersant comprises a polymeric group and at least one group having the formula $-A'\text{-}(B)_y(C)_z$, wherein A and A' are organic chromophore groups. In a second embodiment, the polymeric dispersant comprises a polymeric group and an organic chromophore group capable of interacting with the pigment.

13 Claims, No Drawings

INKJET INK COMPOSITIONS COMPRISING POLYMERIC DISPERSANTS HAVING ATTACHED CHROMOPHORE GROUPS

CROSS-REFERENCE TO RELATED APPLICATIONS

This patent application claims the benefit of U.S. Provisional Patent Application No. 60/763,548, filed Jan. 31, 2006.

BACKGROUND OF THE INVENTION

1. Field of the Invention

The present invention relates to inkjet ink compositions comprising a pigment and a polymer dispersant having attached chromophores.

2. Description of the Related Art

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

In general, pigments alone are not readily dispersible in liquid vehicles, and a variety of techniques have been developed that can provide stable pigment dispersions useful in applications such as inkjet printing. For example, dispersants can be added to the pigment to improve its dispersibility in a particular medium. Examples of dispersants include water-soluble polymers and surfactants. A wide variety of polymers have been used as dispersants, and these are often tailored to the type of pigment to be dispersed. Typically, polymeric dispersants have a molecular weight less than 20,000 in order to maintain solubility and to provide pigment stability. For example, JP 10-130554 describes inkjet ink compositions comprising substituted quinolonoquinolones which further comprise a rosin, resin, surfactant, or dispersant, such as a three-component copolymer composed of methyl methacrylate, ethyl acrylate, and methacrylic acid.

Non-polymeric materials can also be used as dispersants for inkjet inks. For example, U.S. Pat. No. 5,750,323 describes a solid particle aqueous dispersion of a colorant dispersed using a relatively small amount of a compound that is structurally similar to the colorant. This structurally similar additive is structurally distinct from the colorant and contains an identical structural section making up at least 75% of the total molecular weight of the colorant. The additive has at least one substitutent bonded to the identical structural section that has a molecular weight higher than the corresponding substituent of the colorant. However, such additives are described for non-pigment colorants (i.e., filter dyes).

In addition, U.S. Pat. No. 5,716,435 describes a water-dispersed inkjet recording liquid prepared by a salt-milling method in which a mixture containing an organic pigment, a water-soluble inorganic salt, and a water-soluble solvent is mechanically kneaded. A pigment derivative, which is a substituted derivative of a pigment residue or heterocyclic ring residue, or a resin, which is a polymeric dispersant, may also be included. However, such a composition requires the use of both the pigment derivative and polymeric dispersants as separate additives, each of which may be affected by other components in the inkjet ink composition.

Dispersants having pigment derivatives attached to a polymeric group have also been described. For example, GB 2036779 describes polyether disazo dyestuffs having specified formulas which includes a disazo dye and an attached polyalkylene oxide group. These dyestuffs are useful for dying and printing synthetic fibers. Also, JP 63-175080, JP 06-065521, JP 07-041689, and JP 2993088d each describe pigment compositions comprising a pigment and a polymer having an attached quinacridone derivative, which can be used for dispersing a pigment for coatings or varnishes. However, none of these references teaches the use of such additives for the demanding requirements of inkjet ink compositions.

Methods for the preparation of modified pigment products have also been developed which can provide a pigment with a variety of different attached functional groups. For example, U.S. Pat. No. 5,851,280 discloses methods for the attachment of organic groups onto pigments including, for example, attachment via a diazonium reaction wherein the organic group is part of the diazonium salt. Other methods to prepare modified pigments, including those having attached polymeric groups, have also been described. For example, PCT Publication No. WO 01/51566 discloses methods of making a modified pigment by reacting a first chemical group and a second chemical group to form a pigment having attached a third chemical group. These methods provide modified pigments having attached groups and pigment compositions, including inkjet ink compositions, with improved overall performance properties that do not require the addition of dispersant. However, a pigment modification step is needed.

As the inkjet printing industry moves towards print performance similar to that of laser printing, there remains a need for inkjet ink compositions comprising pigments and a dispersant having improved properties, such as improved stability, thereby providing alternatives to modified pigment dispersions.

SUMMARY OF THE INVENTION

The present invention relates to an inkjet ink composition comprising: a) a liquid vehicle, b) a pigment, and c) a polymeric dispersant. In one embodiment of the invention, the pigment comprises a colorant having the formula $A\text{-}(B)_x$ or is a carbon black pigment, and the polymeric dispersant comprises a polymeric group and at least one group having the formula $\text{-}A'\text{-}(B)_y(C)_z$, wherein A and A' are organic chromophore groups; B, which can be the same or different when x or y>1, is a substituent on A or A'; C, which can be the same or different when z>1, is a substituent on A' and is different than B; x, y, and z are 0, 1, 2, 3, or 4 with y being less than or equal to x. In a second embodiment, the pigment comprises a colorant having the formula $A\text{-}(B)_x$, wherein A, B, and x are as described above, and the polymeric dispersant comprises a polymeric group and an organic chromophore group capable of interacting with the pigment.

It is to be understood that both the foregoing general description and the following detailed description are exemplary and explanatory only and are intended to provide further explanation of the present invention, as claimed.

DETAILED DESCRIPTION OF THE INVENTION

The present invention relates to inkjet ink compositions and dispersions comprising a vehicle, a pigment, and a dispersant.

The vehicle of the inkjet ink composition of the present invention is a liquid vehicle and may be either a non-aqueous vehicle or an aqueous vehicle. Preferably, the vehicle is an aqueous vehicle, which is a vehicle that contains greater than 50% water. For example, the aqueous vehicle can be water or mixtures of water with water miscible solvents such as alcohols. Preferably the aqueous vehicle is water, and the inkjet ink composition is an aqueous inkjet ink composition.

The pigment of the inkjet ink composition of the present invention can be any type of pigment conventionally used by those skilled in the art. For example, the pigment may be a black pigment, including various carbonaceous pigments. Preferred black pigments include carbon blacks (Pigment Black 7) such as channel blacks, furnace blacks and lamp blacks.

The pigment may also be an organic colored pigment, including a blue, a black, a brown, a cyan, a green, a white, a violet, a magenta, a red, an orange, or a yellow organic pigment. Mixtures of different pigments can also be used. Organic colored pigments comprise colorants and can be classified by their colorant type. Suitable colorant classes for the colored pigments useful in the inkjet ink compositions of the present invention include, for example, anthraquinones, phthalocyanine blues, phthalocyanine greens, disazos, monoazos, pyranthrones, perylenes, heterocyclic yellows, quinolonoquinolones, isoindolones, indanthrones, quinacridones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982).

Preferably, the organic colored pigment used in the inkjet ink compositions of the present invention is a yellow, magenta, or cyan pigment. Examples of preferred yellow pigments include those comprising quinolonoquinolone colorants, azo colorants, or isoindolone colorants. Examples of preferred magenta pigments include those comprising quinacridone colorants. Examples of preferred cyan pigments include those comprising phthalocyanine or indanthrone colorants.

The colorant of an organic colored pigment comprises an organic chromophore group, which may be further substituted with various substituents. As used herein, the term "organic chromophore group" is that portion of the chemical structure of the colorant that provides the essential color of the colorant. The term "substituent" is a group, particularly a functional group, bonded to the chromophore that further defines the specific color and hue of the colorant and differentiates it from other pigments in the same colorant class. Thus, the organic chromophore group is that portion of the colorant structure to which the substituents are bonded and would be considered to be the backbone or skeleton structure of the colorant.

For example, one class of yellow pigments comprises a quinolonoquinolone colorant. Examples of this type of pigment are Pigment Yellow 218, Pigment Yellow 220, and Pigment Yellow 221, which are shown below:

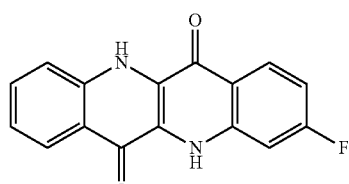

PY 218

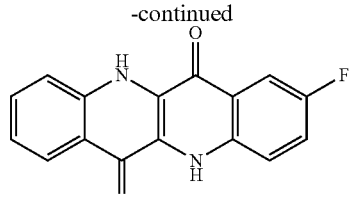

PY 220

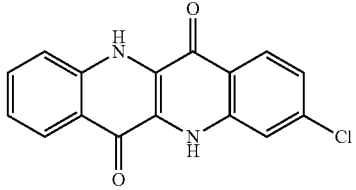

PY 221

For this class of pigments, the organic chromophore group of the colorant would be a quinolonoquinolonyl group and the substituents would be halogen groups. In a similar way, Pigment Violet 19, Pigment Red 122, and Pigment Red 202 each comprise a quinacridone colorant as follows:

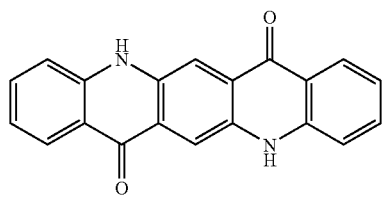

PV 19

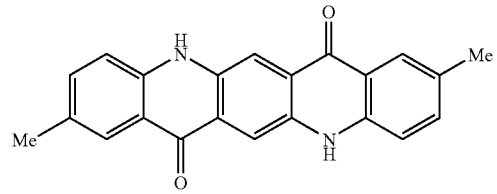

PR 122

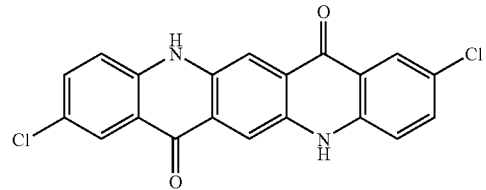

PR 202

Thus, for this class of pigments, the organic chromophore group of the colorant would be the quinacridonyl group. For Pigment Red 122, there are two methyl group substituents and for Pigment Red 202, there are two chlorine group substituents. For Pigment Violet 19, there are no substituents, and the colorant is the organic chromophore.

In the inkjet ink compositions of the present invention, the pigment may comprise a colorant having the formula A-(B)$_x$. A is an organic chromophore group and B is a substituent on A, as defined above. The number of substituents is represented by x and can be any value from 0 to the total number of available sites on the organic chromophore group, depending on the specific colorant class. Preferably x has a value of 0, 1, 2, 3, or 4, although higher levels of substitution may also be possible. When x is greater than or equal to one (i.e, A has more than one substituent), each B can be the same or different. Thus, preferably, A has up to 4 various types of substituents or can have up to 4 of the same substituent.

For example, the pigment can be a yellow pigment comprising a quinolonoquinolone colorant having the formula $A\text{-}(B)_x$, wherein A is a quinolonoquinolonyl group, B is a substituent on A, and x represents the number of substituents, B. The colorant can be either a symmetrical or unsymmetrical quinolonoquinolone colorant and can include those in which B is a halogen group, a methoxy group, or an alkyl group (such as a methyl or ethyl group). For this example, x is preferably 1 or 2. Thus, specific examples of preferred quinolonoquinolone colorants are 2,6-difluorquinolonoquinolone as well as the 3-fluoro-, 2-fluoro-, or 3-chloro-quinolonoquinolone colorants shown above.

As another example, the pigment can be a yellow pigment comprising an azo colorant having the formula $A\text{-}(B)_x$, wherein A is a 2-(phenylazo)-N-(phenyl)-3-oxobutanamidyl group, B is a substituent on A, and x represents the number of substituents, B. Examples of B include alkoxy groups, especially methoxy groups, and nitro groups. For example, the pigment may be Pigment Yellow 74, which comprises a 2-((2-methoxy-4-nitrophenyl)azo)-N-(2-methoxyphenyl)-3-oxobutanamide colorant. For this colorant, the organic chromophore group A is as described above and has 3 substituents B—two methoxy groups and one nitro group. Thus, x is 3. Other azo colorants will be known to one skilled in the art.

As additional examples, the pigment can be a cyan pigment comprising a phthalocyanine colorant having the formula $A\text{-}(B)_x$, wherein A is a phthalocyaninyl group, such as a copper phthalocyaninyl group. Also, the pigment can be a magenta pigment comprising a quinacridone colorant having the formula $A\text{-}(B)_x$, wherein A is a quinacridonyl group.

The pigment can have a wide range of BET surface areas, as measured by nitrogen adsorption, depending on the desired properties of the pigment. As known to those skilled in the art, a higher the surface area will correspond to smaller particle size. If a higher surface area is not readily available for the desired application, it is also well recognized by those skilled in the art that the pigment may be subjected to conventional size reduction or comminution techniques, such as ball or jet milling, to reduce the pigment to a smaller particle size, if desired.

The inkjet ink composition of the present invention further comprises a polymeric dispersant, which is a dispersant comprising a polymeric group. The polymeric group may be any of those known in the art capable of providing a stable pigment dispersion in a liquid vehicle and, preferably, in an aqueous vehicle. For example, the polymeric group may be an anionic, cationic, or nonionic homopolymeric or copolymeric group and can include any group derived from the additional polymeric dispersants described below that can be used in the inkjet ink compositions of the present invention. Specific examples of polymeric groups include polyvinyl alcohol groups, polyvinylpyrrolidone groups, polyurethane groups, acrylate or methacrylate polymeric groups (such as homopolymeric or copolymeric groups prepared from methacrylic acid, acrylic acid, or esters thereof), poly(styrene-acrylate) or poly(styrene-methacrylate) groups (such as copolymeric groups prepared from styrene and methacrylic acid, acrylic acid, or esters thereof), polymeric groups prepared from styrene and maleic acid or maleic anhydride, polymer groups prepared from vinyl acetate (such as vinyl acetate-ethylene copolymeric groups, vinyl acetate-fatty acid vinyl ethylene copolymer groups, vinyl acetate-maleate ester copolymer groups, vinyl acetate-crotonic acid copolymer groups, and vinyl acetate-acrylic acid copolymer groups), and salts thereof. Preferably the polymeric group comprises at least one acid group or salt thereof or anhydride group, such as a methacrylate or acrylate polymeric group or a maleic acid or maleic anhydride polymeric group, a polyurethane group, a styrene-acrylic acid polymeric group, a styrene-methacrylic acid polymeric group, or salts thereof. Suitable salts include inorganic or organic counterions such as $Na^+$, $K^+$, $Li^+$, $NH_4^+$, $NR'_4^+$, where R', which can be the same or different, represents hydrogen or an organic group such as a substituted or unsubstituted aryl and/or alkyl group.

The polymeric group has a molecular weight suitable for the material to function as a dispersant. Typically, the molecular weight of the polymeric group is greater than about 500 and less than about 500,000. Preferred are polymeric groups having a molecular weight from about 1,000 to 100,000, more preferably from about 5,000 to about 80,000, and most preferably from about 10,000 to about 50,000.

In one embodiment of the inkjet ink composition of the present invention, the polymer dispersant further comprises at least one group having the formula $\text{-}A'\text{-}(B)_y(C)_z$. A' is an organic chromophore group and can be any of those described above in relationship to the colorant of the pigment used in the inkjet ink composition of the present invention. B and C are substituents on A', and y and z represent the number of substituents B and C respectively. The value of y and z can be from 0 to the total number of available sites on the organic chromophore group and is preferably 0, 1, 2, 3, or 4. When y and/or z are greater than 1, each B substituent can be the same or different and each C substituent can be the same or different. Substituents B and C can be any of those described above regarding the substituent B of the colorant of the pigment used in the inkjet ink composition of the present invention. However, for the polymeric dispersant, B and C are different.

For this embodiment, preferably, the organic chromophore group is attached to the polymeric group of the polymeric dispersant through a linking group. Thus, the polymeric dispersant may comprise a group having the formula $\text{-LG-}A'\text{-}(B)_y(C)_z$, wherein LG is a linking group, which is a group through which the organic chromophore group, A', is bonded to the polymeric group. Thus, LG may be attached directly to the polymeric group or may be attached to a group that is attached to the polymeric group. LG can be a bond or can be a chemical group that is formed by the reaction of a functional group of the polymeric group, with a reactive group of the organic chromophore group, A', forming, for example, a group such as an ester group, an amide group, an ether group, or the like. For example, if polymeric group is formed from methacrylic acid or acrylic acid, the linking group, LG, may be formed by the reaction of the acid functional group of the polymeric group with a nucleophilic reactive group of the organic chromophore group, A'. In a similar way, LG may be formed by the reaction of an anhydride group of the polymeric group and a nucleophilic group of A'. Also as an example, if the polymeric group has a nucleophilic end group, such as an alcohol or amine, the linking group, LG, may be formed by the reaction of this functional group with an electrophilic reactive group of the organic chromophore group, A'. Other combinations of the functional groups of the polymeric group and reactive groups of A' can be used.

As a particular example, LG may comprise a group having the formula —X-ALK1-, wherein X is O, NR, or S and ALK is an alkylene group, an arylene group, an aralkylene group, or an alkarylene group having 1-18 carbon atoms, including, for example, a C1-C6 alkylene group. In this formula, R is hydrogen, a C1-C6 alkyl group, or an aryl group. Preferably, the polymeric dispersant comprises at least one group having the formula —X-ALK1-A'-(B)$_y$(C)$_z$, wherein A', B, C, y, and z are as described above. More preferably, X is NH and ALK1 is CH$_2$.

The polymeric dispersant may further comprise attached pendant groups in addition to the organic chromophore group. Such groups may be used to optimize the properties of the polymeric dispersant, such as by changing its hydrophobicity/hydrophilicity. For example, if the polymeric group comprises anhydride groups, some of them may be reacted with a nucleophilic group of A', such as an amine group, forming a group having the formula —X-ALK1-A'-(B)$_y$(C)$_z$ described above. Remaining anhydride groups may be further reacted with other nucleophilic components, such as amines and alcohols, forming attached pendant groups. Thus, the polymeric dispersant may further comprise at least one pendant group having the formula —X-ALK2, wherein X, as described above, is O, NR, or S and R is hydrogen, a C1-C6 alkyl group, or an aryl group, and ALK2 is an alkyl group, an aryl group, an aralkyl group, or an alkaryl group having 1-18 carbons. Preferably the pendant group has the formula —X-ALK2, and more preferably, X is NH.

As an example of this embodiment, the pigment can comprise a colorant having the formula A-(B)$_x$, as described above. Thus, in this example, the polymeric dispersant and the colorant of the pigment both comprise organic chromophore groups. This group may be the same organic chromophore or may be different—A and A' may be the same or different. As particular examples, the organic chromophore group of the colorant may be a quinolonoquinolonyl group and the organic chromophore group of the polymeric dispersant may a quinolonoquinolonylene group—i.e., both organic chromophore groups may be a quinolonoquinolone chromophore group. Also, the organic chromophore group of the colorant may be a 2-(phenylazo)-N-(phenyl)-3-oxobutanamidyl group and the organic chromophore group of the polymeric dispersant may be a 2-(phenyleneazo)-N-(phenylene)-3-oxobutanamide group, both being the same azo chromophore. In addition, both A and A' may be phthalocyanine groups (A being a phthalocyaninyl group and A' being a phthalcyaninylene group) or may both be quinacridone groups (A being a quinacridonyl group and A' being a quinacridonylene group). Alternatively, the organic chromophore groups of the colorant and the polymeric dispersant may be different from each other. For example, the organic chromophore group of the colorant may be a phthalocyaninyl group and the organic chromophore group of the polymeric dispersant may be a quinacryidonylene group. Other mixed combinations of pigment colorant and polymeric dispersant organic chromophore groups are also possible.

When A and A' are the same, the substituents on each can be the same or different. For example, if the organic chromophore group of both the colorant and the polymeric dispersant have the same type and number of substituents, then x equals y, and z is 0. If neither have attached substituents, then both y and z are 0 and the organic chromophore group of both the polymeric dispersant and the colorant is the same as the colorant itself. Also, the substituents bonded to the organic chromophore groups of the colorant and the polymeric dispersant can differ, either in number, type, or both. For example, the organic chromophore group of the polymeric group may comprise the same types of substituents as the organic chromophore group of the colorant, but fewer of them. In this case, y is less than x, and z is 0. Also, the organic chromophore group of the polymeric group may comprise different substituents than the organic chromophore group of the polymer group. In this case, y is 0 and z is 1, 2, or 3. Furthermore, the organic chromophore group of the polymeric dispersant may comprise some of the same substituents as the organic chromophore group of the colorant, but fewer of them, as well as at least one additional substituent. In this case, y is less than x and z is 1, 2, or 3.

As another example of this embodiment, the pigment can be a carbon black pigment. Any of those described above may be used. Thus, in this example, the pigment is a carbon black pigment and the polymeric dispersant comprises a polymeric group and an organic chromophore group having the formula described above. As a specific example, the organic chromophore group is either a quinacridonylene group or a 2-(phenyleneazo)-N-(phenylene)-3-oxobutanamide group and the pigment is carbon black. The carbon black pigment can have a wide range of BET surface areas, as measured by nitrogen adsorption, depending on the desired properties of the pigment. Preferably, the pigments have a BET surface area between about 10 m$^2$/g and about 1500 m$^2$/g, more preferably between about 20 m$^2$/g and about 600 m$^2$/g. Also, the carbon black pigment can have a wide variety of primary particle sizes known in the art. For example, the pigment may be a carbon black having a primary particle size of between about 5 nm to about 100 nm, including about 10 nm to about 80 nm and 15 nm to about 50 nm. In addition, the carbon black pigment can also have a wide range of dibutylphthalate absorption (DBP) values, which is a measure of the structure or branching of the pigment. For example, the pigment may be a carbon black having a DBP value of from about 25 to 400 mL/100 g, including from about 30 to 200 mL/100 g and from about 50 to 150 mL/100 g.

In another embodiment of the inkjet ink composition of the present invention, the polymeric dispersant comprises at least one organic chromophore group that is capable of interacting with the pigment used in the inkjet ink composition. For this embodiment, any of the pigments described above may be used. However, it is preferred that the pigment comprises a colorant having the formula A-(B)$_x$, wherein A, B, and x are as described above. Thus, the polymeric dispersant comprises at least one organic chromophore group capable of interacting with the colorant of the pigment.

Preferably, the interacting organic chromophore group is attached to the polymeric group of the polymeric dispersant through a linking group, including any of those described above. For example, the polymeric dispersant may have the formula -LG-Q, wherein LG is a linking group and Q is the organic chromophore group that is capable of interacting with the pigment used in the inkjet ink composition. Q can be any of the organic chromophore groups described above for A and A', as long as the group interacts with the pigment. It is preferred that the interaction between Q and the pigment is strong and therefore preferred types of interactions would include hydrogen bonding and pi-pi stacking. Also, Q may co-crystallize with the pigment, such as by intercalating into the crystal structure through any of the various mechanisms known in the art. Strong interaction between Q of the polymeric dispersant with the pigment, including with the colorant of the pigment, has surprisingly been found to form stable dispersions of the pigment that are also thermally stable and can be printed by an inkjet ink printing process to form images having good overall properties.

As stated previously, the aqueous inkjet ink compositions of the present invention comprises an aqueous vehicle, a pigment, and a polymeric dispersant. Each of these is present in an amount effective to provide desirable image quality (for example, optical density) without detrimentally affecting the performance of the inkjet ink. For example, typically, the pigment will be present in an amount ranging from about 0.1% to about 20% based on the weight of the inkjet ink composition. The amount of the polymeric dispersant can vary depending on such factors as molecular weight and polymer composition. Typically, the polymeric dispersant is used at levels from about 0.5 to about 15 parts relative to 100 parts pigment. Levels outside of this range typically produce inkjet inks with poor dispersion properties, such as large pigment particle sizes. For example, the particle size of the pigment in the inkjet ink composition of the present invention are generally about 200 nm or less.

The inkjet ink compositions of the present invention can be formed with a minimum of additional components (additives and/or cosolvents) and processing steps. However, suitable additives may also be incorporated into these inkjet ink compositions to impart a number of desired properties while maintaining the stability of the compositions. For example, surfactants (non-polymeric dispersants) may be added to further enhance the colloidal stability of the composition. Other additives are well known in the art and include humectants, biocides, binders, drying accelerators, penetrants, and the like. The amount of a particular additive will vary depending on a variety of factors but are generally present in an amount ranging between 0% and 40% based on the weight of the inkjet ink composition. In addition, the inkjet ink compositions may contain organic chromophores which correspond to the organic chromophore group of the polymeric dispersant but which are not attached to the polymeric dispersant, which may result from the preparation of the dispersant. Other organic chromophores may also be used.

Additional dispersing agents (surfactants and/or polymeric dispersants that differ from those described above) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be in solid form or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, maonoglycylsulfates, alkylether phosphates and alkyl phosphates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols; polyvinylpyrrolidones; acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(metha)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-methylstyrene-(meth)acrylic acid copolymers, styrene-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol, 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cylcopropanol; amides such as dimethyl formaldehyde and dimethyl acetamide; ketones or ketoalcohols such as acetone and diacetone alcohol; ethers such as tetrahydrofurane and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and $\epsilon$-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidene; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols, hydroxypropylenecellulose, hydroxyethylcellulose, polyvinylpyrrolidinone, polyvinylether, starch, polysaccharides, polyethyleneimines with or without being derivatized with ethylene oxide and propylene oxide; and the like. Additional examples of water-soluble polymer compounds include various dispersants or surfactants described above, including, for example, styrene-acrylic acid copolymers, styrene-acrylic acid-alkyl acrylate terpolymers, styrene-methacrylic acid copolymers, styrene-maleic acid copolymers, styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers or may be a water dispersible polyurethane.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an OH$^-$ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH$^-$ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like. It is also within the bounds of the present invention to use a mixture of the pigments described herein and modified pigments, such as modified pigments comprising pigments having attached at least one organic group. The modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference.

The inkjet ink compositions can be purified and/or classified using any method known in the art, including for example, ultrafiltration/diafiltration using a membrane, reverse osmosis, and ion exchange as well as filtration, centrifugation, or a combination of the two methods. In this way, unwanted impurities or undesirable large particles can be removed to produce an inkjet ink composition with good overall properties.

The present invention further relates to an inkjet ink set which comprises various inkjet ink compositions and includes at least one inkjet ink composition of the present invention. The inkjet ink compositions of this set may differ in any way known in the art. For example, the inkjet ink set may comprise inkjet ink compositions comprising different types and/or colors of pigments, including, for example, an inkjet ink composition comprising a cyan pigment, an inkjet ink composition comprising a magenta pigment, and/or an inkjet ink composition comprising a black pigment. Other types of inkjet ink compositions may also be used, including, for example, compositions comprising agents designed to fix the inkjet ink compositions onto the substrate. Other combinations will be known in the art.

The present invention will be further clarified by the following examples which are intended to be only exemplary in nature.

EXAMPLES

Examples 1-9

The following examples describe the preparation of organic chromophore groups having a reactive group that can be used to prepare the polymeric dispersants used in the inkjet ink compositions of the present invention.

Example 1

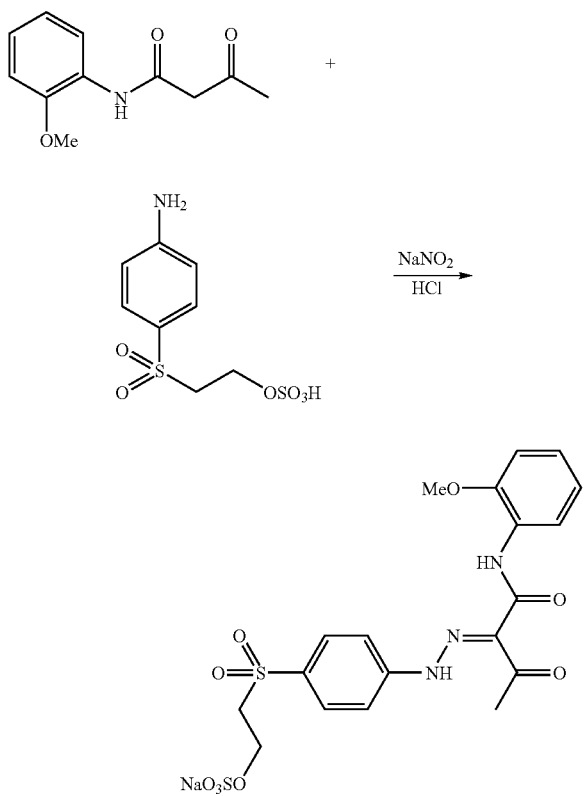

A mixture of 28.4 g of 2-(4-aminophenylsulphonyl)ethane sulfuric acid (APSES), 150 mL of ice water, and 12 mL of 37% HCl was combined with 6.9 g of sodium nitrite in 50 mL water. After 40 min of stirring at 5° C., the diazotization reaction was stopped by destroying any excess nitrous acid by the addition of sulfamic acid, and this diazo-APSES solution was kept on ice until used for the coupling reaction.

A mixture of 20.7 g of acetoacet-o-anisidide (AAOA), 30 mL isopropyl alcohol, and 50 mL of a 2 M NaOH solution, was heated to 70° C. to dissolve the AAOA. After adding 500 mL ice water, AAOA was precipitated as a fine dispersion by the addition of 7 mL of 100% acetic acid. To this was added 90 g of sodium acetate, followed by dropwise addition of the diazo-APSES solution at a temperature below 5° C., which resulted in the formation of a bright yellow precipitate (AAOA-APSES). This was allowed to stir overnight. The product was separated by centrifugation, washed with ice water, and kept as a wet paste.

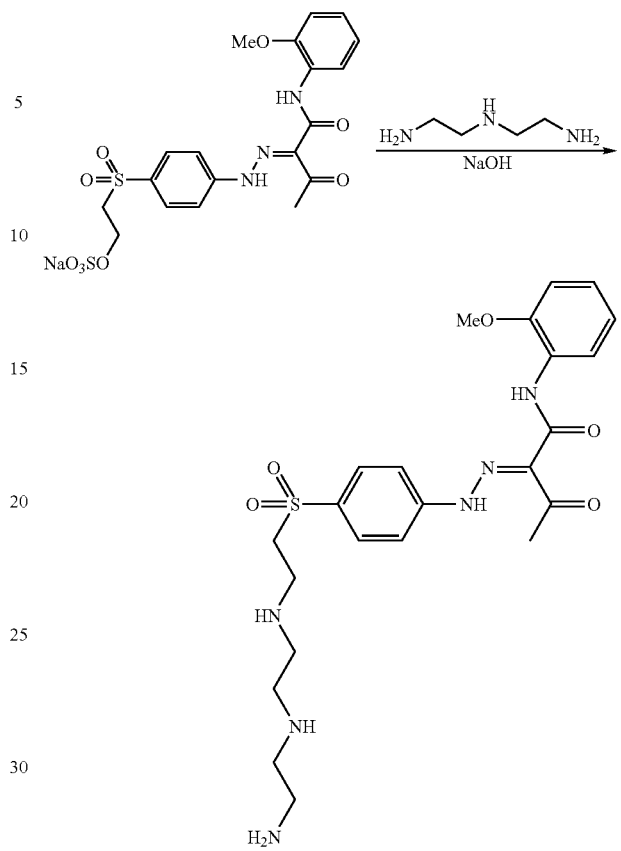

To a mixture of 30.2 g of diethylenetriamine in 1 L of water was added a 4N solution of sodium hydroxide to raise pH to 12.5. To this was slowly added a solution of 30.6 g of AAOA-APSES in 3 L of water. A yellow precipitate formed, and the mixture was stirred overnight after the addition was completed, centrifuged to remove excess diethylene triamine, and washed 2 times with water. The resulting precipitate (AAOA-APSES-DETA) was filtered off and dried in high vacuum at the ambient temperature for 8 hours.

Example 2

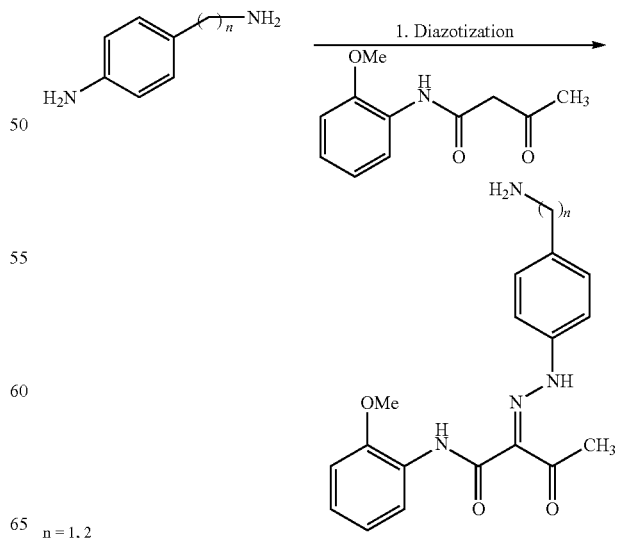

A mixture of 12.2 g of 4-aminobenzylamine (ABA, n=1) or 20.9 g of 2-(4-aminophenyl)ethylamine bis-hydrochloric acid (APEA, n=2), 30 mL of 37% HCl, and 150 mL of water was cooled to 5° C. and diazotized by slow addition of a solution of 6.9 g of sodium nitrite in water. The temperature during the diazotization (<5° C.) was maintained by adding of 100 g of crushed ice during the reaction. After 20 min of stirring, the diazotization reaction was stopped by destroying any excess of nitrous acid by the addition of sulfamic acid, and this diazo-ABA or diazo-APEA solution was kept on ice until used for the coupling reaction.

A mixture of 20.7 g of acetoacet-o-anisidide (AAOA), 300 mL of water, and 4 g of sodium hydroxide was homogenized in a sonic bath until a clear solution formed. Then AAOA was reprecipitated by addition of 6 mL of concentrated acetic acid, followed by 60 mL of saturated solution of sodium acetate. The mixture was diluted with 1 L of ice water and cooled to 5° C. To this mixture was added the diazo-ABA or diazo-APEA solution, which was added dropwise over 1 hour while maintaining the pH at 4.9-5.1 by adding small amounts of sodium acetate. The viscous coupling mass was diluted with 1 L of ice water and stirred for an additional hour. After this, the pH was raised to 12 by addition of a 2M sodium hydroxide solution. The resulting precipitate (AAOA-ABA or AAOA-APEA) was filtered off, washed with 2 L of ice water having a pH of 10, and finally washed with an additional 2 L of DI water. The material was dried in a vacuum oven at 60° C. for 48 hours. HPLC analysis of the crude material showed no impurities, and $^1$H-NMR analysis was consistent with the desired product.

Example 3

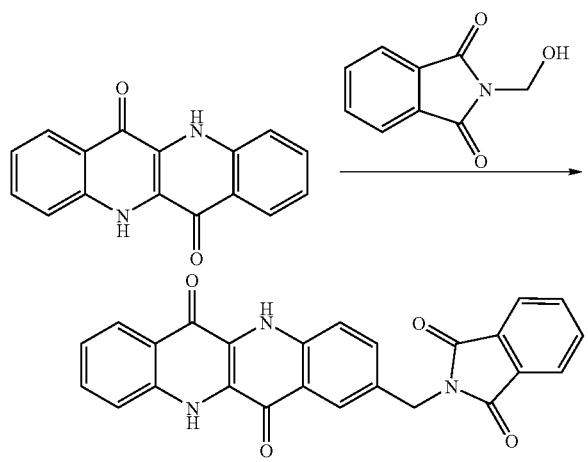

Seventeen grams of dry quinolonoquinone were stirred with 170 g of concentrated sulfuric acid at room temperature until complete dissolution of the solid material was achieved. After this, 12.5 g of N-hydroxymethylphthalimide was added. The resulting mixture was stirred at 60° C. for 3 hours, allowed to cool to room temperature, and poured into 2.5 L of ice water. The resulting precipitate (phthalimidomethylquinolonoquinolone) was filtered off and washed with water to a pH of approximately 6. The solid phthalimidomethylquinolonoquinolone was dried in the vacuum oven to constant weight.

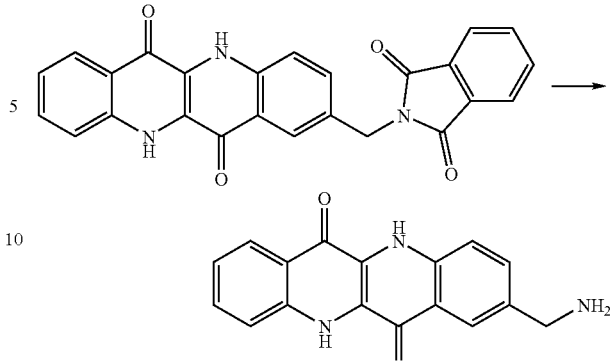

A mixture of 10 g of phthalimidomethylquinolonoquinolone and 50 mL of a 20% NaOH solution was stirred at 85° C. for 3 hours. Then, 75 mL of a 20% HCl solution was added, and the mixture was stirred at 85° C. for an additional 3 hours. The mixture was cooled to room temperature and neutralized with a 20% NaOH solution. The resulting precipitate was filtered off, washed with water, and dried to obtain 5.9 g of a yellow powder. $^1$H-NMR and mass-spectral data showed that the product was primarily the desired mono-(aminomethyl)-quinolonoquinolone (AMQQ)

Example 4

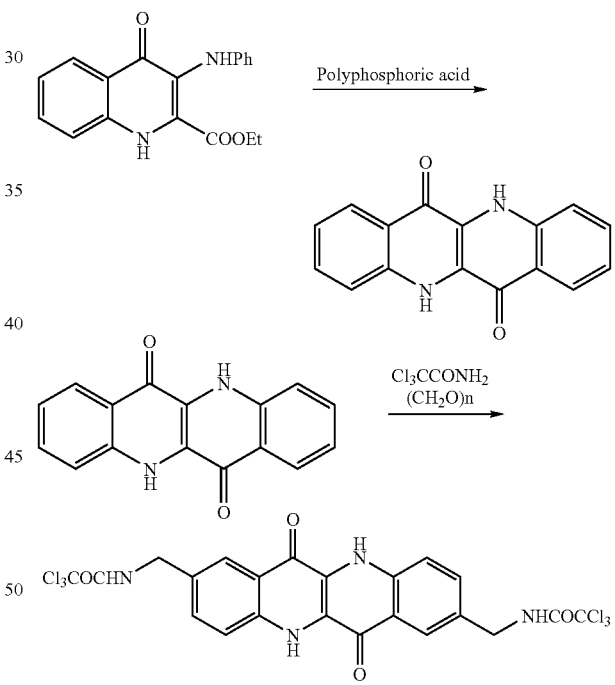

Polyphosphoric acid (500 g, 84% min $P_2O_5$) was heated to 110° C., and 21 g of 2-ethoxycarbonyl-3-anilinoquinoline-4 (1H)-one was added over a 10 minute period. The temperature was raised to 150° C., and the mixture was stirred for three hours to complete the cyclization. Then the mixture was cooled to 50° C., and 10.5 g of paraformaldehyde and 33.4 g of 2,2,2-trichloroacetamide were added. The temperature was then raised to 85° C., and the reaction mixture was stirred for 3 hours at this temperature. The hot melt was poured into 2000 mL of warm DI water. The resulting yellow precipitate of 2,8-bis-(trichloroacetylamidomethyl)quinolonoquinolone was filtered off and washed with hot water to a pH>4.0. The yield was close to 97%, and the product was used in the next step (hydrolysis) without further purification.

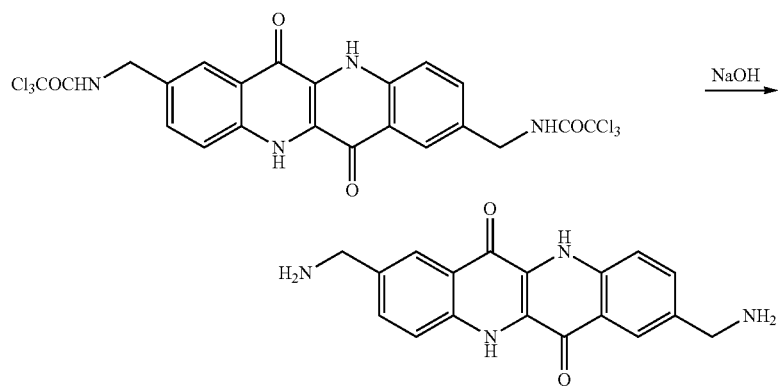

The crude 2,8-bis-(trichloroacetylamidomethyl)quinolonoquinolone (24 g) was hydrolyzed by mixing with 400 mL of water and 100 mL of a 6M NaOH solution. The mixture was refluxed for 6 hours, cooled to room temperature, and neutralized with a 4M HCl solution to a pH of 6. The resulting precipitate was filtered off to give 80.5% of 2,8-bis-(aminomethyl)quinolonoquinolone (2AMQQ)

Example 5

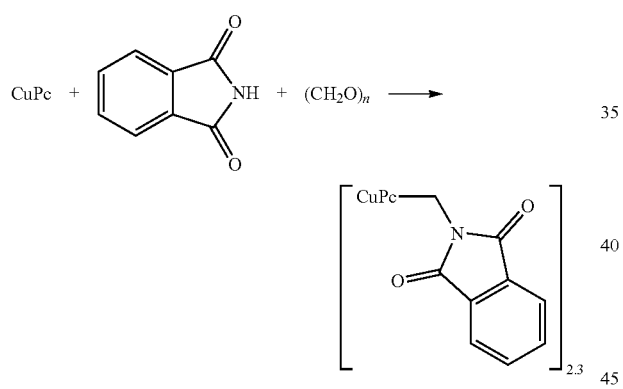

(CuPc = copper phthalocyanine)

A mixture of 150 g of 100% sulfuric acid, 10 g of copper phthalocyanine, 15.25 g of phthalimide, 5.5 g of paraformaldehyde, and 5.0 g of phosphorus pentoxide was heated at 75° C. for 4 hours. The mixture was poured into 1000 g of ice water. The resulting precipitate was filtered off and washed to a pH of approximately 6. The solid (phthalimidomethyl-CuPc) was slurried with acetone and filtered to give 15 g (97%) of a dark blue powder.

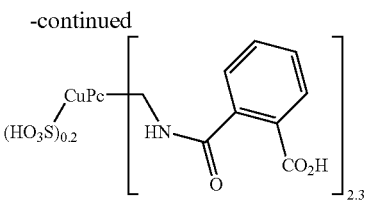

-continued

A mixture of 140 g of 100% sulfuric acid and 10 g of phthalimidomethyl-CuPc was heated at 100° C. for 4 hours. The mixture was poured into 1000 g of ice water. The resulting precipitate was filtered off, washed to a pH of 3, and dried to give 11.2 g (91.8%) of partially hydrolized product.

A mixture of 10 g of the partially hydrolyzed product and 300 mL of a 0.2M sodium hydroxide solution was refluxed for 1.5 hours. Then a 6M HCl solution was added slowly at 90-95° C. until the pH was 1. The initially formed precipitate gradually redissolved. The mixture was then refluxed for another 6 hours. Concentrated HCl (40 mL) was then added, and the mixture was cooled to form a precipitate, which was filtered off, yielding 31 g (93.5%) of the hydrochloride salt of aminomethyl copper phthalocyanine (AMPc).

Example 6

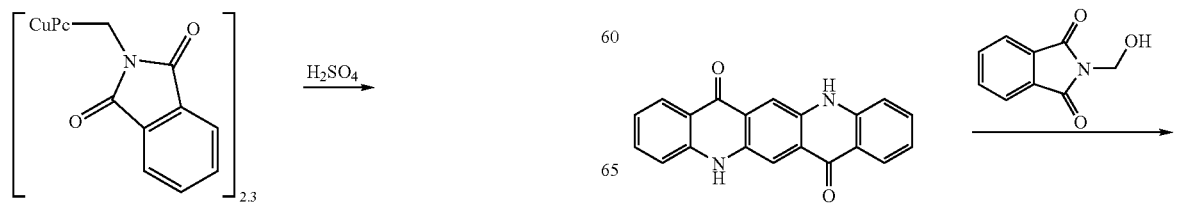

-continued

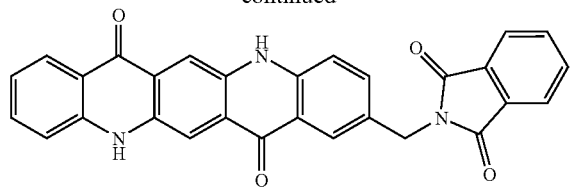

Twenty eight grams of quinacridone were dissolved in 320 g of 98% sulfuric acid. Then 16.5 g of hydroxymethylphthalimide was added. The mixture was heated at 56° C. for 3 hours and then poured into 2.5 kg of ice-water. The resulting precipitate (phthalimidomethylquinacridone) was filtered off, washed with water to a pH of approximately 6, and dried, yielding 46 g of crude 2-phthalimidomethylquinacridone (the expected isomer based on the directing effects of both the amino and carbonyl groups).

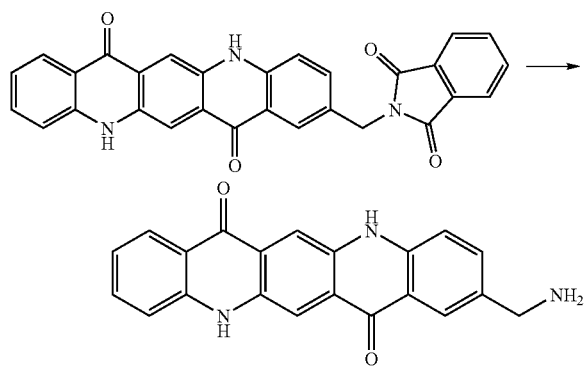

A mixture of 30 g of crude phthalimidomethylquinacridone and 85 mL of a 20% NaOH solution was heated at 85° C. for 3 hours. Then 120 mL of a 20% HCl solution was introduced, and the same temperature was maintained for 3 more hours. The cooled solution was neutralized with a dilute sodium hydroxide solution to a pH of approximately 6. The resulting precipitate was filtered off, washed with water, and dried under vacuum, yielding 10 g of 2-aminomethylquinacridone (AMQA).

Example 7

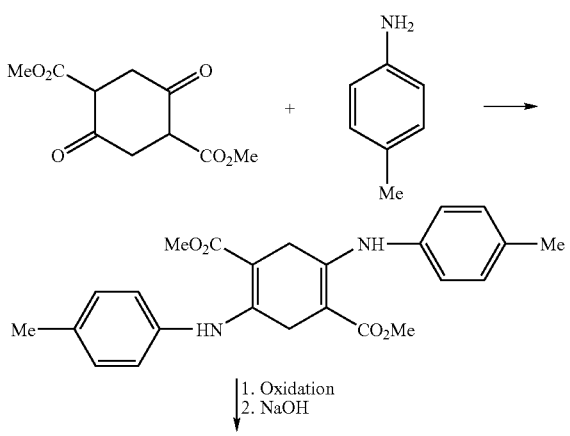

-continued

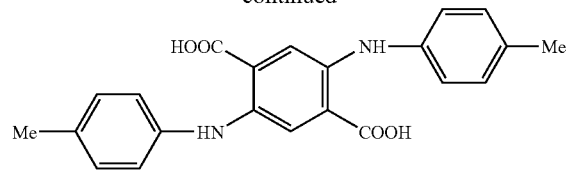

Dimethyl succinoylsuccinate, (70.37 g, 0.308 mol), 4-toluidine (74.1 g, 0.692 mol), absolute ethanol (700 mL), and concentrated hydrochloric acid (1.7 mL) were placed into a flask equipped with an overhead mechanic stirrer and reflux condenser. The mixture was heated at reflux with stirring for 8 hour under nitrogen atmosphere. The reaction mixture was then cooled to room temperature, and to this was added sodium 3-nitrobenzenesulfonate (76 g, 0.31 mol) and 43 g of sodium hydroxide in 70 mL of water. This was then heated at reflux for 4 hours. Water (250 mL) was added, and the mixture turned into clear solution which was filtered to remove any insoluble material. The filtrate was diluted to 2500 mL with DI water and neutralized with concentrated sulfuric acid to pH 2 to obtain 2,5-bis-p-tolylaminoterephthalic acid as a purple precipitate, which was filtered off, washed with DI water to pH>5, and dried in a vacuum oven (55° C.) for 2 days. Yield was 114.0 g (97.7%) of purple solid. $^1$HNMR (DMSO-d6) spectrum was consistent with the desired product.

Polyphosphoric acid (369 g, 84% min. $P_2O_5$) was warmed to 110° C. under mechanical stirring, and 2,5-bis-p-tolylaminoterephthalic acid (15.7 g, 0.042 mol) was added. The resulting mixture was stirred and heated at 160° C. for 3 hours. Then, the mixture was cooled to 50° C., and paraformaldehyde (1.9 g, 0.063 mol) and trichloroacetamide (7.5 g, 0.046 mol) were added. Heating was continued at 75° C. for 3 hours. The mixture was poured into 1000 mL of DI water, and the magenta precipitate was filtered off and washed with water to pH>4. The precipitate is then washed with ethanol until the filtrate ran clear. The resulting precipitate, (trichloroacetamidomethyl)dimethylquinacridone, was dried in the vacuum oven (60° C.) overnight. Yield was 20.5 g of magenta powder (95%).

Elemental analysis: Cl, 19.80; N, 7.70; Calculated: Cl, 20.66; N, 8.16.

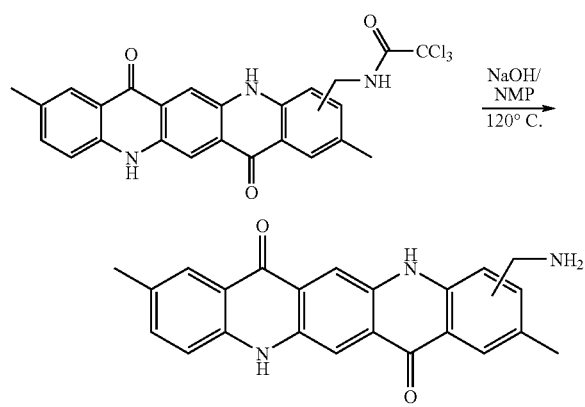

(Trichloroacetamidomethyl)dimethylquinacridone (10 g, 0.0194 mol) and 100 mL of N-methylpyrrolidinone (NMP) were heated at 120° C. for 15 minutes, after which time the solution was filtered to remove insoluble material. Then an aqueous solution of sodium hydroxide (6N, 13.0 mL) was added, and the resulting mixture was heated at 120° C. under a nitrogen atmosphere overnight. The mixture was poured into 600 mL of water and cooled to room temperature. The resulting precipitate was filtered off and washed with water, and the product was dried in a vacuum oven (60° C.) overnight. The resulting product, aminomethyldimethylquinacridone (AmDMQA) contained less than 0.5% Cl, which indicated the completeness of the hydrolysis.

Example 8

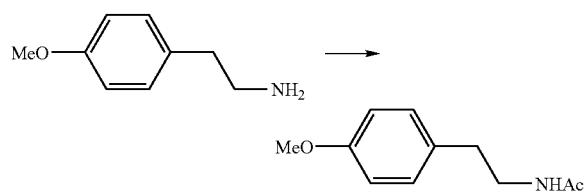

To 100 g of 2-(4-methoxyphenyl)ethylamine in 500 mL of chloroform was slowly added 100 mL of triethylamine acetic anhydride (72 g), and this was stirred at 20° C. for 40 minutes. The mixture was then extracted twice with a dilute aqueous solution of HCl (0.4 N, 400 mL) followed by a saturated aqueous solution of $NaHCO_3$ (2×400 mL). The solvent was removed by rotary evaporation, and the residue was dried in a vacuum oven (45° C.), resulting in an off-white powder, N-[2-(4-methoxyphenyl)ethyl]acetamide (120 g, 93.9% yield). $^1$HNMR (DMSO-d6) spectrum was consistent with the desired product.

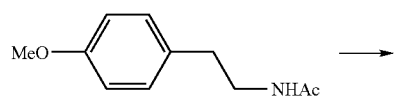

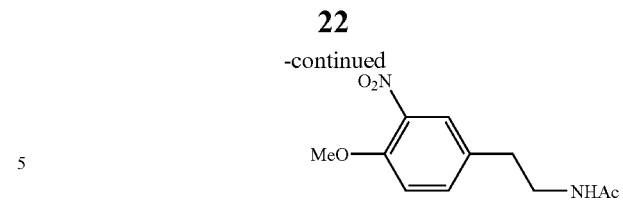

A solution of 70 g of N-[2-(4-methoxyphenyl)ethyl]acetamide in 330 mL of acetic acid was introduced slowly into 350 mL of 70% nitric acid so that the temperature was between 30-35° C. The addition process took 1 hour. The mixture was stirred at 30-35° C. for additional 40 minutes and was then poured into 1500 mL of ice water. The resulting slurry was extracted with chloroform (2×400 mL). The organic phase was extracted with a saturated aqueous solution of $NaHCO_3$ (2×400 mL) and then with water (2×400 mL). The solvent was then removed by rotary evaporation to produce 65 g of N-[2-(4-methoxy-3-nitrophenyl)ethyl]acetamide, which was further purified by recrystallization from ethyl acetate to yield 48 g (55.6% yield) of yellow crystals. $^1$HNMR (DMSO-d6) spectrum was consistent with the desired product.

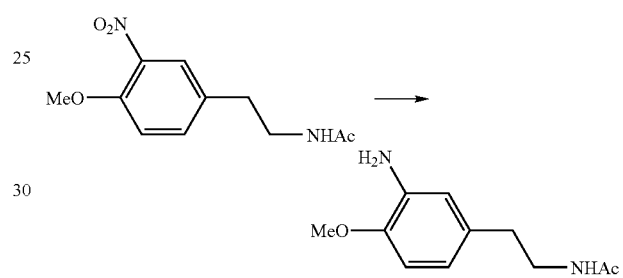

N-[2-(4-methoxy-3-nitrophenyl)ethyl]acetamide (7.4 g) in 150 mL of ethanol was hydrogenated in the presence of 3.5 mL of concentrated HCl and 0.4 g of 10% Pd/C at 30-40 psi for 3 hours in a Parr shaker. After this time, the catalyst was filtered off, and the solvent was removed by rotary evaporation to yield 7.1 g of N-[-2-(3-amino-4-methoxyphenyl)ethyl]acetamide hydrochloride as an off-white solid (94.0% yield). $^1$HNMR (DMSO-d6) spectrum was consistent with the desired product.

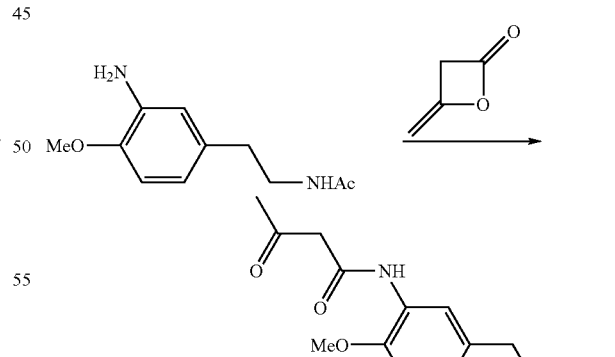

N-[-2-(3-amino-4-methoxyphenyl)ethyl]acetamide hydrochloride (19 g) was mixed with 40 mL N,N-dimethylformamide and 18 g of diketene followed by slow addition of 3 mL of triethylamine. The mixture was stirred at 80-85° C. for 30 minutes and then poured into 300 mL of water. The aqueous solution was extracted with chloroform (2×200 mL) and the solvent was removed by rotary evaporation to yield 21.9 g (96.5%) of N-[5-(2-acetylaminoethyl)-2-methoxyphenyl]-3-oxo-butyramide as a light yellow oil. $^1$HNMR (DMSO-d6) spectrum was consistent with the desired product.

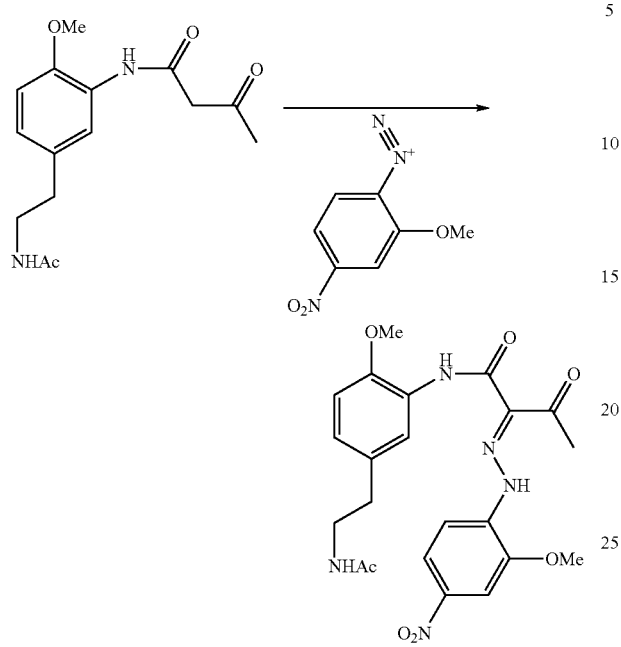

N-[5-(2-acetylaminoethyl)-2-methoxyphenyl]-3-oxo-butyramide (6.93 g), dissolved in 150 mL of water by addition of 2 mL of a 2N NaOH solution, was cooled in an ice bath (<5° C.), and acetic acid was added slowly to pH 5, so the coupler reprecipitated in a fine crystalline form. Then sodium acetate was added to bring the coupler dispersion to a pH of 5.5.

4-Nitro-2-anisidine (4 g) was mixed with 75 g of ice-water and 7.1 mL of concentrated HCl. The mixture was diazotized at below 5° C. with a solution of 1.64 g of NaNO$_2$ in 30 mL of ice water. Excess nitrous acid was destroyed by addition of sulfamic acid. The diazotized 4-nitro-2-anisidine solution was added to the coupler dispersion over 20 minutes with vigorous stirring. The mixture was kept at pH>5 by addition of solid sodium acetate as needed. The temperature was maintained below 5° C. by outside cooling with ice.

After the diazonium solution addition was complete, the reaction mixture was allowed to warm to room temperature and was stirred overnight at 20° C. and for 20 minutes at 60° C. The resulting precipitate was filter off and washed with D.I. water, yielding N-[5-(2-acetamidoethyl)-2-methoxyphenyl]-2-[(2-methoxy-4-nitrophenyl)-hydrazono]-3-oxobutyramide as a brown presscake (9.77 g, 87.4% yield). $^1$HNMR (DMSO-d6) spectrum was consistent with the desired product.

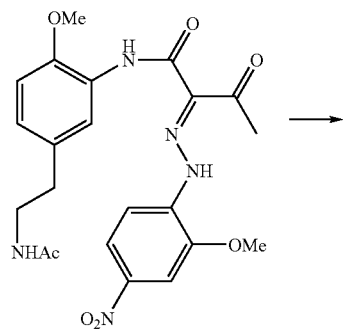

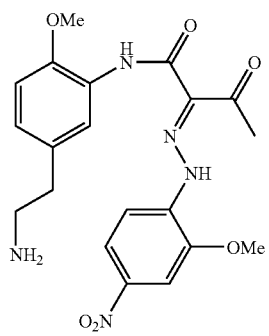

The product described in the previous step, N-[5-(2-acetamidoethyl)-2-methoxyphenyl]-2-[(2-methoxy-4-nitronitrophenyl)-hydrazono]-3-oxobutyramide (4.6 g) was mixed with 150 mL of NMP and 20 mL of concentrated HCl and heated at 112° C. for 6 hours. The reaction mixture was poured into 1000 mL of water and left overnight. The resulting precipitate was filtered off, washed with water and then with a dilute aqueous NaHCO$_3$ solution to a neutral pH, and finally dried in a vacuum to give 4.0 g (95.2%) of N-[5-(2-aminoethyl)-2-methoxyphenyl]-2-[(2-methoxy-4-nitro-phenyl)-hydrazono]-3-oxo-butyramide (AePY74) as a yellow powder. $^1$HNMR (DMSO-d6) spectrum was consistent with the desired product.

Example 9

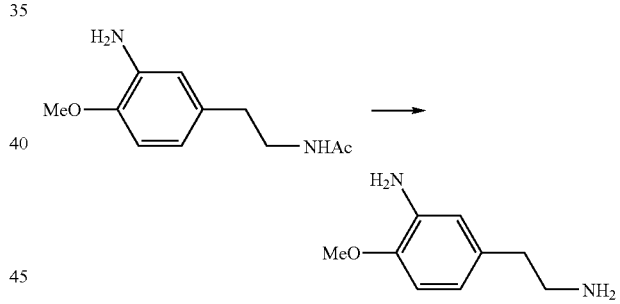

N-[-2-(3-amino-4-methoxyphenyl)ethyl]acetamide hydrochloride, prepared as described in Example 8 (15 g) and 175 mL of 2N HCl were heated at reflux for 6 hours. The solvent was removed by rotary evaporation, and the residue was washed with ethanol. The resulting white precipitate was filtered off and dried in vacuum, yielding 13.7 g (94%) of 5-(2-aminoethyl)-2-methoxyphenylamine (AMMPA) dihydrochloride as white crystals. $^1$HNMR (DMSO-d6) spectrum was consistent with the desired product.

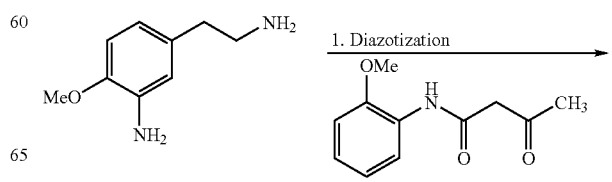

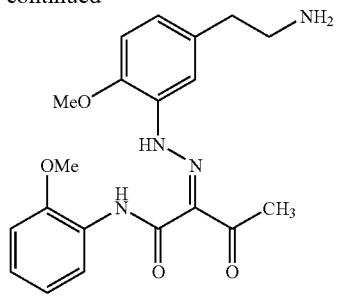

5-(2-Aminoethyl)-2-methoxyphenylamine (AMMPA) dihydrochloride (4.02 g) was dissolved in 55 mL of ice water with 5 mL of conc. HCl, and the solution was cooled in an ice bath to below 5° C. The amine was diazotized with 1.17 g of NaNO₂ dissolved in 15 mL of water. The mixture was stirred at below 5° C. for 20 minutes, and any excess nitrous acid was destroyed by addition of sulfamic acid.

Acetoacet-o-anisidide (AAOA, 3.48 g) was dissolved in a mixture of 50 mL of water and 0.84 g of NaOH. The solution was cooled to 5° C., and the coupler was reprecipitated by addition of acetic acid to pH 5. Then, a saturated aqueous solution of sodium acetate was added to adjust the pH to 5.6. To this mixture was added the diazonium salt solution of AMMPA dropwise. A yellow precipitate forms instantly. The mixture was stirred at room temperature for 3 hours, and the precipitate was filtered off and washed with water, yielding 6.45 g (98%) of 2-{[5-(2-aminoethyl)-2-methoxyphenyl]-hydrazono}-N-(2-methoxyphenyl)-3-oxo-butyramide (AAOA-AMMPA) as a yellow solid. ¹HNMR (DMSO-d6) spectrum was consistent with the desired product.

Examples 10-15

The following examples describe the preparation of polymeric dispersants useful in the inkjet ink compositions of the present invention comprising a polymeric group and at least one group comprising a linking group and an organic chromophore group.

Example 10

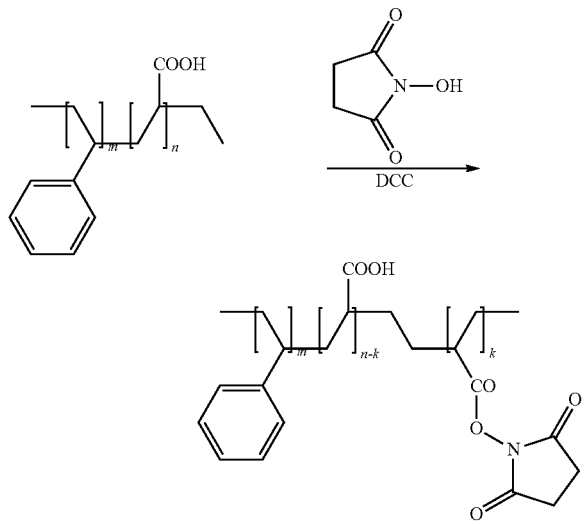

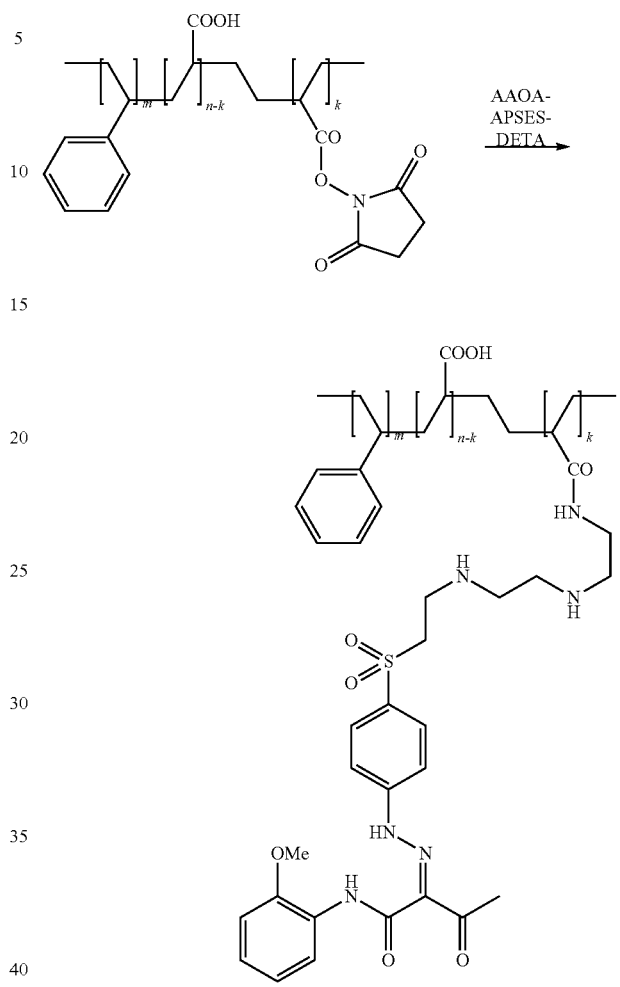

Fifty grams of Joncryl®683 (a styrene-acrylic acid polymer available from Johnson Polymers having an acid number of 165 and a $M_w$ of 7000-9000) and 1.925 g of N-hydroxysuccinimide (HOSI) were dissolved in 200 mL of dry THF. To this, a solution of 3.45 g of N,N'-dicyclohexylcarbodiimide in 50 mL of THF was added dropwise over a period of 5-10 min. Stirring at room temperature was continued for 5 hours. The resulting precipitate of N,N'-dicyclohexylurea was filtered off. To the filtrate, containing HOSI-activated polymer, was added 6.76 g of AAOA-APSES-DETA (Example 1), and the mixture was refluxed for 5 hours. The resulting polymeric dispersant solution was evaporated on a rotary evaporator to remove the bulk of THF. The residue was treated with a solution of 5 g NaOH in 125 mL water, and the mixture was centrifuged to remove insoluble material. The transparent supernatant, which was a solution a polymeric dispersant comprising a polymeric group and an organic chromophore group (AAOA-APSES-DETA-J683) sodium salt, was used without further purification.

Example 11

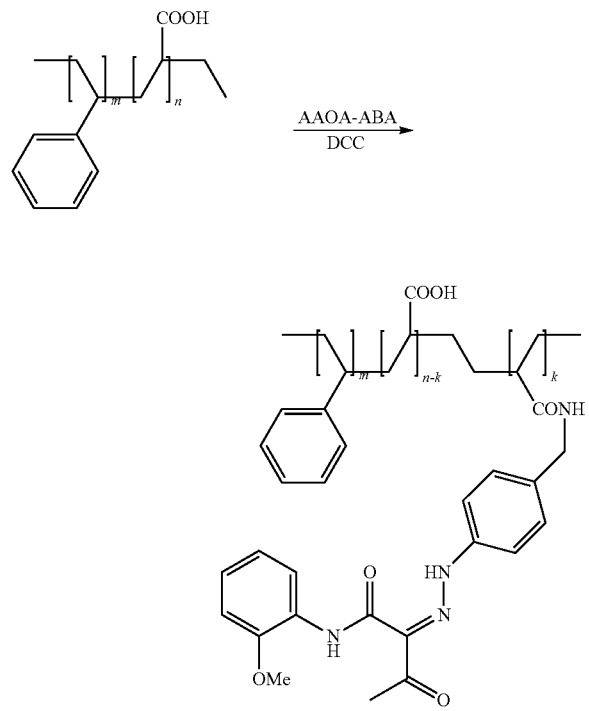

One hundred grams of Joncryl® 9683 (a styrene-acrylic acid polymer available from Johnson Polymers having an acid number of 165 and a $M_w$ of 7000-9000), 8.8 g AAOA-ABA (Example 3), and 5.36 g of N,N'-dicyclohexylcarbodiimide were dissolved in 500 mL of dry N-methylpyrrolidinone. The mixture was stirred for 48 hours at room temperature with protection against atmospheric moisture. The resulting N,N'-dicyclohexylurea precipitate was filtered off, and the filtrate was added dropwise to 4 L of water while stirring. A flaky yellow precipitate formed. Then the pH was lowered to 2, and the resulting polymeric dispersant comprising a polymeric group and an organic chromophore group (AAOA-ABA-J683) was filtered off. This was washed with 4 L of water and allowed to dry on the filter funnel overnight. The yield was nearly quantitative. Analysis by GPC indicated that approximately 96% of AAOA-ABA was covalently attached to the polymer.

Example 12

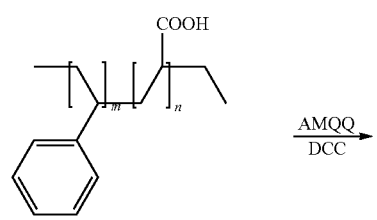

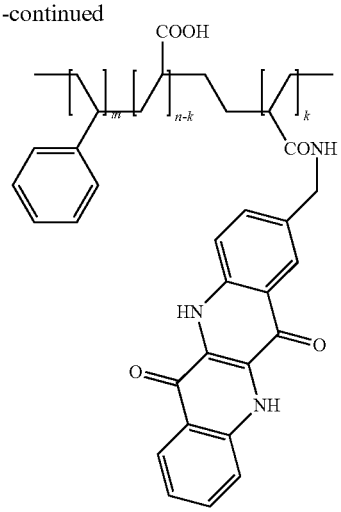

The procedure described in Example 11 was followed, with the exception that AMQQ (Example 4) was used instead of AAOA-ABA (Example 3). The resulting polymeric dispersant comprising a polymeric group and an organic chromophore group (AMQQ-J683) was obtained in similar yields and with similar levels of attached chromophore groups.

Example 13

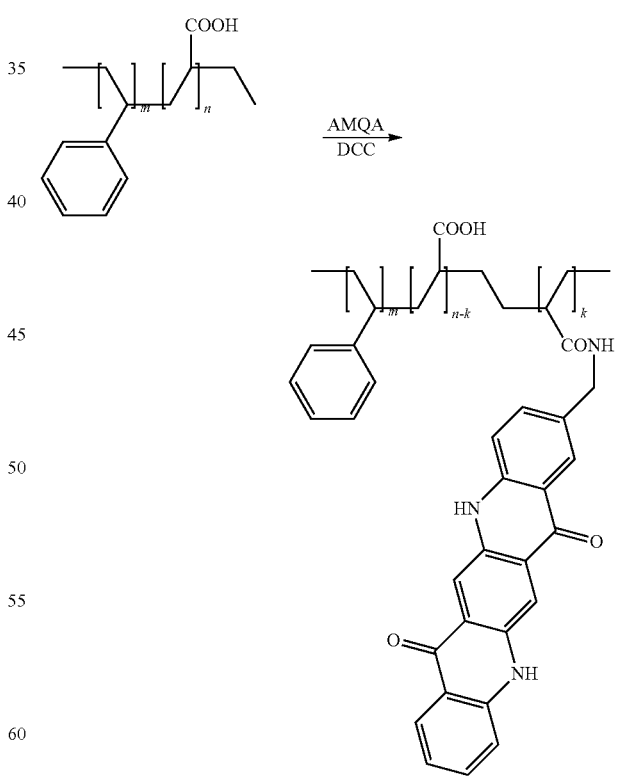

The procedure described in Example 11 was followed, with the exception that AMQA (Example 6) was used instead of AAOA-ABA (Example 3). The resulting polymeric dispersant comprising a polymeric group and an organic chromophore group (AMQA-J683) was obtained in similar yields and with similar levels of attached chromophore groups.

Example 14

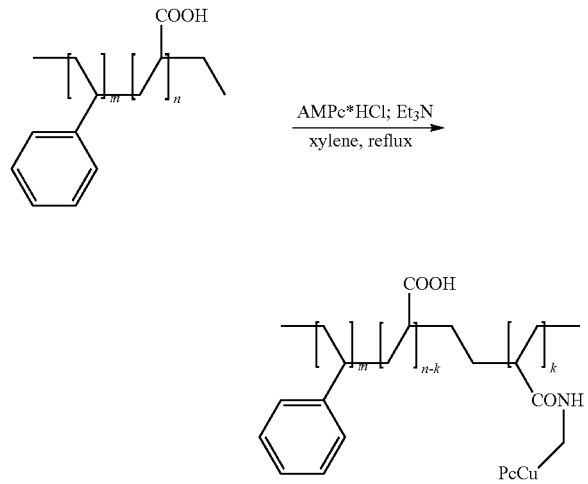

A mixture of 9.6 g of AMPc hydrochloride (Example 5), 84 g of Joncryl® 683 (a styrene-acrylic acid polymer available from Johnson Polymers having an acid number of 165 and a $M_w$ of 7000-9000), 2 g of triethylamine, and 250 mL of xylene was heated at reflux for 8 hours. The resulting water formed during the reaction was removed using a Dean-Stark apparatus. The resulting gummy product solidified as it was cooled to room temperature. The solvent was decanted from the solid, and the solid was dried in a vacuum oven, yielding 114 g of dark blue crude polymer.

Ten grams of this crude product was purified by dissolving in 120 mL of a 0.2M NaOH solution at 70° C., filtering the solution, and finally neutralization with a 2 N HCl solution. The resulting dark blue polymeric precipitate was filtered off, washed with water and dried in vacuum oven to obtain 6.8 g of dark blue solid, a polymeric dispersant comprising a polymeric group and an organic chromophore group (AMPc-J683).

Example 15

The procedure described in Example 14 was followed, with the exception that 2AMQQ (Example 4) was used instead of AMPc hydrochloride (Example 5) and Joncryl® 690 acrylic polymer (a styrene-acrylic acid polymer available from Johnson Polymers having an acid number of 240 and a Mw of approximately 16000) was used instead of Joncryl® 683 acrylic polymer, resulting in the formation of a polymeric dispersant comprising a polymeric group and an organic chromophore group (2AMQQ-J690).

Example 16

This example describes the preparation of a polymeric dispersant comprising a polymer and an attached group that is not an organic chromophore group.

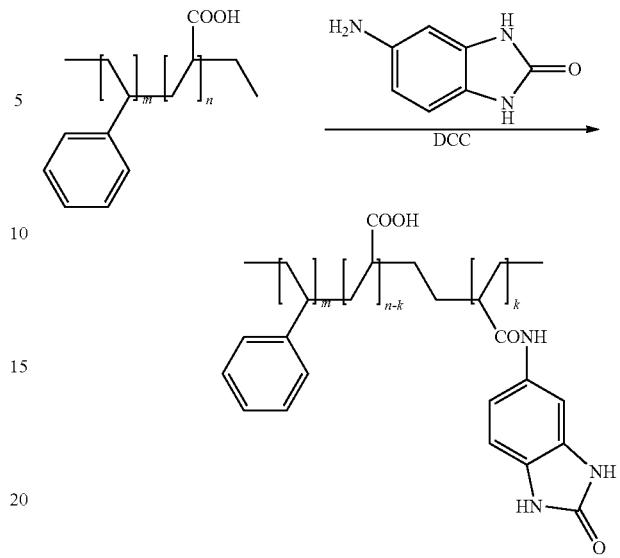

The procedure described in Example 11 was followed, with the exception that 5-aminobenzimidazolone (ABI) was used instead of AAOA-ABA (Example 3). The resulting polymeric dispersant comprising a polymeric group and an organic group, capable of hydrogen bond forming, but not specifically related to any chromophore group (ABI-J683) was obtained in similar yields and with similar levels of attached ABI group.

Example 17 and Comparative Examples 1-2

The following examples demonstrate improved properties of an inkjet ink composition of the present invention, comprising a pigment and a polymeric dispersant that comprises a polymeric group and an organic chromophore group.

A mixture of 29 g of Pigment Yellow 74, 500 mL of water, and a dispersant was mixed using a Silverson® rotor-stator high shear mixer at 6,500 rpm for 2 hours. For Example 17, 10 g of the polymeric dispersant of Example 10 (AAOA-APSES-DETA-J3683) was used. For Comparative Example 1, a combination of 1.35 g of AAOA-APSES-DETA (Example 1) and 10 g of Joncryl® 683 acrylic polymer Na⁻salt was used. For Comparative Example 2, 10 g of Joncryl® 683 acrylic polymer Na⁻salt was used. For each, the resulting mixture was sonicated using a Misonix immersing sonicator for 30 min. Excess dispersant was removed by diafiltration using 10 volumes of a 0.1 M NaOH solution followed by 10 volumes of DI water using a membrane filter. The resulting yellow dispersion was concentrated to 10-12% solids, and the average particle size was measured using a UPA Microtrac laser scattering equipment. Results are shown below in the Table 1.

TABLE 1

| Example # | Dispersant | Mean Particle Size |
|---|---|---|
| Ex 17 | AAOA-APSES-DETA-J683 | 88 nm |
| Comp Ex 1 | Joncryl ® 683 Na⁺ salt + AAOA-APSES-DETA 1.35 g | 138 nm |
| Comp Ex 2 | Joncryl ® 683 Na⁺ salt; | No dispersion formed |

As the data shows, a yellow pigment dispersion prepared using a polymeric dispersant comprising a polymeric group and an organic chromophore group (Example 17) has a lower particle size compared to a dispersion prepared using the same polymer and organic chromophore separately (Comparative Example 1). The particle size of the dispersion of Example 17 was less than 100 nm while that of Comparative Example 1 was greater than 100 nm. In addition, the dispersion of Example 17 was also found to be more thermally stable than that of Comparative Example 1. No stable dispersion resulted using a polymeric dispersant without an attached organic chromophore group (Comparative Example 2). Thus, it has surprisingly been found that improved properties result using a polymeric dispersant comprising an attached organic chromophore group. Based on this data, it would be expected that the dispersion of Example 17 could be used as an inkjet ink composition of the present invention.

Examples 18-23 and Comparative Examples 3-4

The following examples describe the preparation of inkjet ink compositions of the present invention (Examples 18-23) as well as comparative inkjet ink compositions (Comparative Examples 3 and 4).

An attritor (type 01STD from Union Process, Akron, Ohio) was charged with 10 g pigment (either dry or as a presscake, the amount of which was determined by its solids content), 100 mL water, and 500 g of zirconium silicate beads (0.07-0.125 mm). Five grams of a polymeric dispersant comprising a polymeric group and an organic chromophore group was then added. For each example, the specific type of pigment and the specific polymeric dispersant are shown in Table 2 below. PY 74 is Pigment Yellow 74, which is an azo pigment. PR 122 is Pigment Red 122, which is a quinoacridone pigment. PB 15:4 is Pigment Blue 15:4, which is a phthalocyanine pigment (cyan). Finally, PY 218 and PY 220 are Pigment Yellow 218 and 220, which are quinolonoquinolone pigments. PY 218 is 3-fluoroquinolonoquinolone and PY 220 is 2-fluoroquinolonoquinolone.

As shown for Example 18, the dispersant was added as a solution in 25 mL of methyl ethyl ketone (MEK), followed by an appropriate amount of a 1 M NaOH solution to neutralize all of the acid groups in the polymer. For Examples 19-23 and Comparative Examples 3-4, the polymeric dispersant was solubilized with the appropriate amount of a 1 M NaOH solution prior to adding to the attritor, without the use of methyl ethyl ketone.

Once these components were combined, mixing at 600 rpm began, and an additional 500 g of beads were also added. After mixing for 2 hours, the media was filtered off using a coarse fritted filter, and the media was washed with 200 mL of water.

For Example 18, the MEK was removed by evaporation under vacuum. For some of the examples, the resulting dispersion was sonicated for 1-3 hours until 50% of the particle size fell below 100 nm, as measured by a UPA Microtrac laser scattering equipment. These examples are identified in Table 2 below.

Each dispersion was centrifuged at 4,500 rpm for 40 min to remove traces of media and coarse particles and then concentrated using membrane diafiltration to a final concentration of approximately 10% solids. The average particle size of these dispersions was measured using a UPA Microtrac laser scattering equipment, and the results are shown below in the Table 2 below.

TABLE 2

| Ex # | Pigment | Polymeric Dispersant | MEK | Sonication | Dispersion yield % | Particle size |
|---|---|---|---|---|---|---|
| 18 | PY 74 | AAOA-ABA-J683 (Example 8) | Yes | 0 hrs | 95 | 106 nm |
| 19 | PR 122 | AMQA-J683 (Example 10) | No | 0 hrs | 95 | 100 nm |
| 20 | PB 15:4 | AMPc-J683 (Example 11) | No | 0.5 hrs | 93 | 107 nm |
| 21 | PY 220 | AMQQ-J683 (Example 9) | No | 1 hrs | 95 | 91 nm |
| 22 | PY 218 | AMQQ-J683 (Example 9) | no | 0.5 hrs | 95 | 92 nm |
| 23 | PY 218 | 2AMQQ-J690 (Example 12) | no | 2 hrs | 95 | 100 nm |
| Comp Ex 3 | PY 218 | ABI-J683 (Example 14) | no | 2 hrs | 90 | 140 nm |
| Comp Ex 4 | PY 74 | J683 | no | 1 hr | 90 | 140 nm |

As the data shows, the particle size of the dispersions of Examples 18-23 are very small, indicating that each of these dispersions could be used as an inkjet ink composition. Thus, the data also shows that, if a pigment comprising a colorant having an organic chromophore group is combined with a polymeric dispersant comprising a polymeric group and an organic chormophore group that is similar to that of the colorant, a stable inkjet ink composition results. In particular, for Examples 21 and 22, both types of quinolonquinolone pigments were well dispersed using the same polymer dispersant, comprising a quinolonoquinolonyl group. Without wishing to be bound by theory, it is believed that these polymeric dispersants may provide stable dispersions by interaction with the pigment, such as through hydrogen bonding. When no specific interaction is present, larger particle sizes result. This is shown by Comparative Example 3 and 4, in which polymeric dispersants are used that do not comprise an organic chromophore group. The resulting particle sizes are considerably higher. Also, in Comparative Example 3, since the ABI group is expected to hydrogen bond with PY 218, the results suggest that the interaction between the organic chromophore group of the polymeric dispersant used in Examples 22 and 23 may be through co-crystallization, either alone or in combination with hydrogen bonding.

Examples 24-29 and Comparative Example 5-6

The following examples demonstrate the print performance of inkjet ink compositions of the present invention (Examples 24-29) as well as comparative inkjet ink compositions (Comparative Examples 5 and 6).

Inkjet ink compositions were formulated using 10% by weight glycerol, 5% by weight triethyleneglycol, 1% by weight Surfynol® 465 surface active agent, and 4% by weight pigment, with the balance of the composition being water. Each of the compositions of Examples 18-23 (for Examples 24-29) and Comparative Examples 3 and 4 (for Comparative Examples 5 and 6) were used. The resulting inkjet ink compositions were printed using an Epson C86 printer.

For Examples 24-29, the inks printed reliably, providing saturated color prints. Virtually no striping and banding was observed when printed on the following substrates: Xerox 4024, Xerox Recycled, Hammermill Copy Plus, HP Advanced, Great White, Epson InkJet Photo Quality Paper, Epson Premium Glossy Photo Paper, and Canon PR-101 Photo Paper. Thus, the ink jet ink compositions of the present invention produce images having good overall properties.

The inkjet ink compositions of Examples 24-29 and Comparative Examples 5-6 were evaluated for shelf life stability by subjecting the compositions to heat aging at 70° C. during 6 weeks. Particle size growth was monitored using a UPA Microtrac laser scattering equipment. For the inkjet ink compositions of the present invention (Examples 24-29) in which a polymeric dispersant comprising an organic chromophore group was, the average particle size growth was no more than 10%, whereas for the comparative inkjet ink compositions (Comparative Examples 5 and 6), where a different polymeric dispersant was used, particle size growth exceeded 50%. Thus, the inkjet ink compositions of the present invention have surprisingly been found to have improved properties over comparative inkjet ink compositions.

Examples 30-32

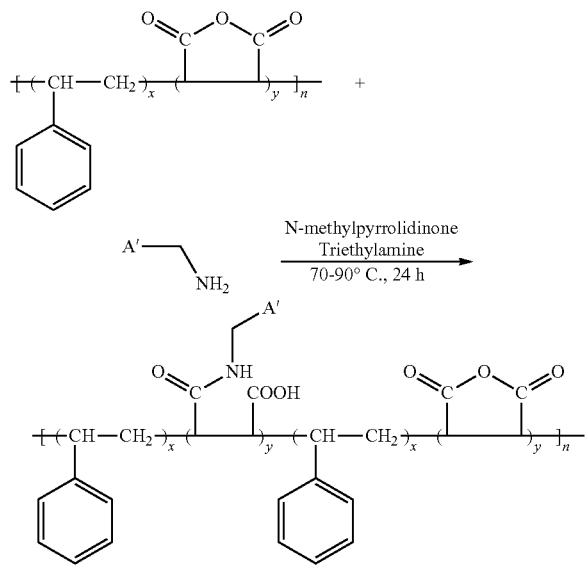

The following examples describe the preparation of polymeric dispersants useful in the inkjet ink compositions of the present invention comprising a polymeric group and at least one group comprising a linking group and an organic chromophore group.

Example 30

To a 300 mL round bottom flask equipped with a Claisen adaptor, drying tube and thermocouple was added N-methylpyrrolidinone (NMP, 100 mL, Fisher Chemical certified A.C.S. grade), SMA3000 UFP@ (a styrene-maleic anhydride polymer available from Sartomer, x:y=3:1, 10 g, 24.4 mmol maleic anhydride), AAOA-APEA from Example 2 (A'$CH_2NH_2$, 1 g, 2.8 mmol), and triethylamine (0.39 mL, 2.8 mmol, Aldrich supplier 99.5% product of Atofina Chemical Company). The solution was then heated to 70-90° C. and allowed to stir over two days. After this time, the reaction mixture was allowed to cool to room temperature, and the product was precipitated by adding the mixture to a solution of HCl (15 mL) and DI water (750 mL). The crude polymeric dispersant was then filtered and washed with DI water (2×300 mL), yielding of a polymeric dispersant comprising a polymeric group and an organic chromophore group (AAOA-APEA-SMA), as a wet cake (29.4% wt. percent solids). Analysis by gel permeation chromatography (GPC) indicated that approximately 72% of the AAOA-APEA was attached to the polymer.

Example 31

A polymeric dispersant was prepared using the procedure described in Example 30, with the exception that A'$CH_2NH_2$ is AmDMQA from Example 7 (1 g, 2.9 mmol) instead of AAOA-APEA, resulting in the formation of polymeric dispersant comprising a polymeric group and an organic chromophore group (AmDMQA-SMA).

Example 32

A polymeric dispersant was prepared using the procedure described in Example 30, with the exception that A'$CH_2NH_2$ is AmDMQA from Example 7 (1 g, 2.9 mmol) instead of AAOA-APEA, and SMA EF40 (a styrene-maleic anhydride polymer available from Sartomer, x:y=4:1, 10 g, 19.5 mmol maleic anhydride) was used instead of SMA3000, resulting in the formation of polymeric dispersant comprising a polymeric group and an organic chromophore group (AmDMQA-EF).

Examples 33-34

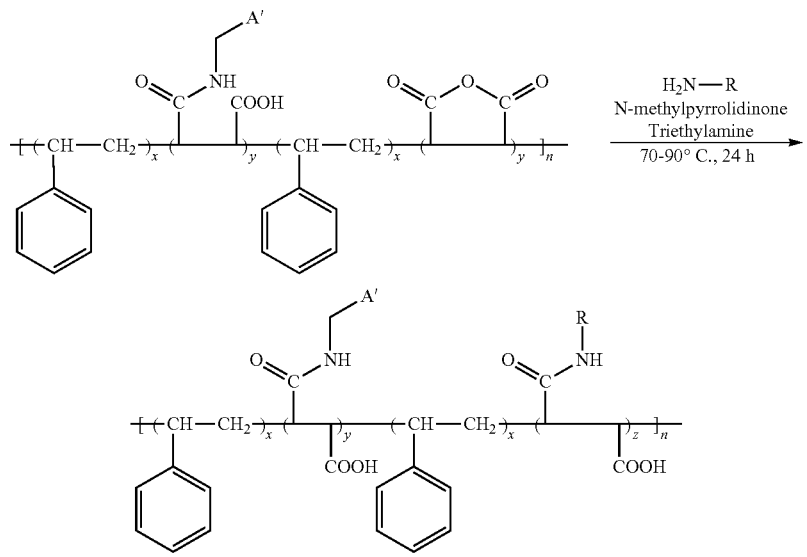

The following examples describe the preparation of polymeric dispersants useful in the inkjet ink compositions of the present invention comprising a polymeric group and at least one group comprising a linking group and an organic chromophore group and further comprising at least one pendant group attached to the polymeric group.

Example 33

To a 300 mL round bottom flask equipped with a Claisen adaptor, drying tube and thermocouple was added N-methylpyrrolidinone (NMP, 100 mL, Fisher Chemical certified A.C.S. grade), SMA EF40 (a styrene-maleic anhydride polymer available from Sartomer, x:y=4:1, 25 g, 48.75 mmol maleic anhydride), AAOA-APEA from Example 2 (A'CH$_2$NH$_2$, 2.5 g, 6.7 mmol), and triethylamine (0.90 ml, 6.7 mmol, Aldrich supplier 99.5% product of Atofina Chemical Company). The solution was then heated to 70-90° C. and allowed to stir overnight. The next day, heptylamine (NH$_2$—R, 5.18 g, 45 mmol) was added along with an additional portion of triethylamine (6.3 mL, 45 mmol), and this was allowed to stir overnight. The next day, the reaction mixture was allowed to cool to room temperature, and the product was precipitated by adding the mixture to a solution of HCl (15 mL) and DI water (750 mL). The crude polymeric dispersant was then filtered, washed with DI water (2×300 mL), and dried under vacuum, yielding of a polymeric dispersant comprising a polymeric group, an organic chromophore group, and a pendant amine group (AAOA-APEA-C7N-EF).

In addition, a variety of polymeric dispersants, having different pendant groups, could be prepared by this procedure using amines having from 1 to 18 carbon atoms.

Example 34

A polymeric dispersant was prepared using the procedure described in Example 32, with the exception that A'CH$_2$NH$_2$ is AmDMQA (from Example 7, 2.5 g, 6.7 mmol) instead of AAOA-APEA and nonylamine (NH$_2$—R, 6.45 g, 45 mmol) was used instead of heptylamine, resulting in the formation of polymeric dispersant comprising a polymeric group, an organic chromophore group, and a pendant amine group (AmDMQA-C9N-EF).

Examples 35-42 and Comparative Examples 7-11

The following examples demonstrate improved properties of an inkjet ink composition of the present invention, comprising a pigment and a polymeric dispersant that comprises a polymeric group and an organic chromophore group.

Pigment dispersions were prepared using one of the following methods.

Method 1

In an attritor bowl (Szegvari Attritor System) filled to half volume with zirconium silicate bead milling media (0.07 mm-0.125 mm) was added 10 g of pigment with stirring (600 rpm). In a separate beaker, 5 g of dispersant was dissolved in aqueous base (1 M sodium hydroxide, base equivalency 2.5 times the molar maleic anhydride content) with heat (approximately 60° C.). The aqueous dispersant solution was then added to the attritor bowl, and the milling mixture was diluted with approximately 200 mL of DI water to promote efficient and fluid milling. The attritor was allowed to operate for approximately one hour. After this time, the zirconium silicate media was filtered off and rinsed several times with additional DI water (3×100 mL). The rinses were combined with the dispersion, and the total volume of pigment dispersion was then sonicated at a maximum power of 60 W (Misonix Sonicator 3000, Model S-3000, Mixonix Inc.) to reduce particle size to <150 nm. The pigment dispersion was then diafiltered to increase the concentration to approximately 10-15% and then further diafiltered with DI water (5 volumes). The dispersion was then centrifuged at 4500 RPM for 45 min at 5° C. using a temperature controlled Sorval Stratos Centrifuge to reduce the amount of large particles, yielding the final pigment dispersion (10-15% solids).

Method 2

In an attritor bowl (Szegvari Attritor System) filled to half volume with zirconium silicate bead milling media (0.07 mm-0.125 mm) was added 10 g of pigment with stirring (600 rpm). In a separate beaker, 5 g of dispersant was dissolved in an organic co-solvent (approximately 20-50 mL of methyl ethyl ketone (MEK), although other co-solvents such as N-methylpyrrolidinone (NMP) and 2-pyrrolidone (2P) could also be used) with heat (approximately 60° C.). Aqueous base was added to the attritor bowl (1 M sodium hydroxide, base equivalency 2.5 times the molar maleic anhydride content) followed by the dispersant solution, and the milling mixture was then diluted with approximately 150-200 mL of DI water to promote efficient and fluid milling. The attritor was allowed to operate for approximately one hour. After this time, the zirconium silicate media was filtered off and rinsed several times with additional DI water (3×100 mL). The rinses were combined with the dispersion, and the total volume of pigment dispersion was diafiltered to increase the concentration to approximately 10-15% and then further diafiltered with DI water to remove traces of organic co-solvent (5 volumes). The dispersion after diafiltration was concentrated down to 14-16% solids and then sonicated at a maximum power of 60 W (Misonix Sonicator 3000, Model S-3000, Mixonix Inc.) to reduce particle size to <150 nm). The dispersion was then centrifuged at 4500 RPM for 45 min at 5° C. using a temperature controlled Sorval Stratos Centrifuge to reduce the amount of large particles, yielding the final pigment dispersion (10-15% solids).

Method 3

In a beaker, 5 g of dispersant and 10 g of pigment were combined in 150 g of an organic co-solvent (methyl ethyl ketone (MEK), although other co-solvents such as N-methylpyrrolidinone (NMP) and 2-pyrrolidone (2P) could also be used) with heat (approximately 60° C.) and was added to an attritor bowl (Szegvari Attritor System) filled to half volume with zirconium silicate bead milling media (0.07 mm-0.125 mm) with stirring (600 rpm). The attritor mill was allowed to operate for 30 min at 600 rpm, and then aqueous base was added (1 M sodium hydroxide, base equivalency 2.5 times the molar maleic anhydride content). After the base was added, the attritor bowl was deluged with 100-150 mL of DI water, subsequently inverting phases from organic to aqueous. The attritor was then allowed to operate for approximately one hour further. After this time, the zirconium silicate media was filtered off and rinsed several times with additional DI water (3×100 mL). The rinses were combined with the dispersion, and the total volume of pigment dispersion was diafiltered to increase the concentration to approximately 10-15% and then further diafiltered with DI water to remove traces of organic co-solvent (5 volumes). The dispersion was then concentrated down to 14-16% solids and then sonicated at a maximum power of 60 W (Misonix Sonicator 3000, Model S-3000, Mixonix Inc.) to reduce particle size to <150 nm. The dispersion was then centrifuged at 4500 RPM for 45 min at 5° C. using a temperature controlled Sorval Stratos Centrifuge to reduce the amount of large particles, yielding the final pigment dispersion (10-15% solids).

Method 4

In a beaker, 5 g of dispersant and 10 g of pigment were combined in 150 g of an organic co-solvent (methyl ethyl ketone (MEK), although other co-solvents such as N-methylpyrrolidinone (NMP) and 2-pyrrolidone (2P) could also be used) with heat (approximately 60° C.). Once homogeneous, this was then added slowly to a beaker of aqueous base (450 g, base equivalency 2.5 times the molar maleic anhydride content) equipped with a rotostator blender at maximum stirring. After complete addition, the rotostator was allowed to operate for an additional 10 minutes. Then the rotostator was stopped and rinsed several times with additional DI water (3×100 mL). The rinses were combined with the dispersion, and the total volume of pigment dispersion was diafiltered to increase the concentration to approximately 10-15% and then further diafiltered with DI water to remove traces of organic co-solvent (5 volumes). The dispersion was then concentrated down to 14-16% solids and then sonicated at a maximum power of 60 W (Misonix Sonicator 3000, Model S-3000, Mixonix Inc.) to reduce particle size to <150 nm). The dispersion was then centrifuged at 4500 RPM for 45 min at 5° C. using a temperature controlled Sorval Stratos Centrifuge to reduce the amount of large particles, yielding the final pigment dispersion (10-15% solids).

Specific pigments and dispersants used for each example, along with the resulting particle size (mv, in microns) are shown in Table 3 below.

TABLE 3

| Example # | Pigment | Dispersant | Method | Particle size |
|---|---|---|---|---|
| 35 | PY 74 | AAOA-APEA-SMA (Ex 30) | 1 | 0.1228 |
| 36 | PY 74 | AAOA-APEA-C7N-EF (Ex 33) | 1 | 0.1456 |
| Comp Ex 7 | PY 74 | SMA3000 | 1 | 0.1183 |
| 37 | PR 122 | AmDMQA-SMA (Ex 31) | 1 | 0.0904 |
| Comp Ex 8 | PR 122 | SMA3000 | 1 | 0.0747 |
| 38 | PB 15:4 | AmDMQA-SMA (Ex 31) | 1 | 0.1157 |
| Comp Ex 9 | PB 15:4 | SMA3000 | 1 | 0.0855 |
| 39 | BP700 | AmDMQA-SMA (Ex 31) | 1 | 0.1199 |
| Comp Ex 10 | BP700 | SMA3000 | 1 | 0.1206 |
| 40 | BP700 | AmDMQA-EF (Ex 32) | 2 | 0.1445 |
| Comp Ex 11 | BP700 | EF40 | 1 | 0.1111 |
| 41 | BP700 | AmDMQA-C9N-EF (Ex 34) | 4 | 0.1141 |
| 42 | BP700 | AAOA-APEA-C7N-EF (Ex 33) | 3 | 0.1476 |

Thermal stability trials were conducted at 70° C. for three separate formulations of each example: the neat dispersion at 4% pigment, the dispersion at 4% pigment with 10% 1,2-hexanediol (1,2HD), and the dispersion at 4% pigment with 10% tetraethylene glycol monobutyl ether (TEGMBE). Particle size growth was monitored using a UPA Microtrac laser scattering equipment. A dispersion was considered stable when a particle size increase of <20% was observed compared to the initial particle size while a dispersion was considered unstable when a particle size increase >20% was observed. Results for each dispersion are shown in Table 4 below.

TABLE 4

| Example # | Neat | 10% 1,2-HD | 10% TEGMBE |
|---|---|---|---|
| 35 | stable week 6 | stable week 6 | stable week 6 |
| 36 | stable week 6 | stable week 6 | stable week 6 |
| Comp Ex 7 | unstable week 1 | unstable week 6 | unstable week 1 |
| 37 | stable week 6 | unstable week 1 | stable week 6 |
| Comp Ex 8 | unstable week 4 | unstable week 0 | unstable week 1 |
| 38 | stable week 6 | stable week 6 | stable week 6 |
| Comp Ex 9 | stable week 6 | unstable week 0 | stable week 6 |
| 39 | stable week 6 | stable week 6 | stable week 6 |
| Comp Ex 10 | unstable week 6 | unstable week 1 | unstable week 1 |
| 40 | stable week 4 | stable week 4 | stable week 4 |
| Comp Ex 11 | stable week 6 | unstable week 1 | unstable week 1 |
| 41 | stable week 2 | stable week 4 | stable week 4 |
| 42 | stable week 2 | stable week 2 | stable week 2 |

As the results show, yellow pigment dispersions prepared using a polymeric dispersant comprising a polymeric group and an organic chromophore group (Example 35 as well as Example 36, which further comprises a pendant amine group) exhibited excellent heat-aging stabilities (70° C.) after 6 weeks alone as a neat dispersion, with 10% 1,2-hexanediol (HD), and with 10% triethyleneglycol monobutylether (TEGMBE). By comparison, a dispersion prepared with the same pigment and a polymeric dispersant without an organic chromophore group (Comparative Example 7) exhibited poor heat-aging stabilities and complete failure (70° C.) after only 1 week heat aging trials either neat, with 10% 1,2-hexanediol (HD), and with 10% triethyleneglycol monobutylether (TEGMBE). Furthermore, a magenta pigment dispersion prepared using a polymeric dispersant comprising a polymeric group and an organic chromophore group (Example 37) also exhibited excellent heat-aging stabilities (70° C.) after 6 weeks alone as a neat dispersion. With 10% 1,2-hexanediol (HD), this dispersion exhibited significant growth over time but not as dramatic of a growth as observed in the absence of pigment dispersant comprising an organic chromophore group (Comparative Example 8). With 10% triethyleneglycol monobutylether (TEGMBE), the dispersion was much more stable with only a modest particle size growth after 6 weeks heat aging while the comparative sample failed stability trials after only one week. In addition, a cyan pigment dispersion comprising a polymeric dispersant having an organic chromophore group (Example 38) also exhibited excellent heat-aging stabilities (70° C.) after 6 weeks alone as a neat dispersion, with 10% 1,2-hexanediol (HD), and with 10% triethyleneglycol monobutylether (TEGMBE), particularly compared to a similar dispersion prepared using a polymeric dispersant without an organic chromophore group (Comparative Example 9), which exhibited poor heat-aging stability upon initial formulation with 10% 1,2-hexanediol (HD). Surprisingly, improved dispersion stability was found whether the organic chromophore group was the same as the organic chromophore group of the colorant of the pigment (Examples 35-37) or whether they were different groups (Example 38).

In addition, it has also surprisingly been found that stable black dispersions can be formed comprising carbon black and a polymeric dispersant having an organic chromophore group. This is shown by Example 39 and Example 40. These black dispersions, which include either a magenta or yellow organic chromophore group, exhibited excellent heat-aging stabilities (70° C.) after 6 weeks alone as a neat dispersion, with 10% 1,2-hexanediol (HD), and with 10% triethyleneglycol monobutylether (TEGMBE). Excellent stability results were also observed when the polymeric dispersant further comprised a pendant amine group (Example 41 and Example 42). By comparison, dispersions of the same carbon black with polymeric dispersants not having an organic chromophore group (Comparative Example 10 and Comparative Example 11) exhibited very poor heat-aging stabilities (70°

C.) after only one week with 10% 1,2-hexanediol (HD) and with 10% triethyleneglycol monobutylether (TEGMBE).

Thus, it has surprisingly been found that improved properties result using a polymeric dispersant comprising an attached organic chromophore group. Based on this data, it would be expected that the dispersions of Examples 35-42 could be used as an inkjet ink composition of the present invention.

Examples 43-44

The following examples describe the preparation of polymeric dispersants useful in the inkjet ink compositions of the present invention comprising a polymeric group and at least one group comprising a linking group and an organic chromophore group.

Example 43

To a 300 mL round bottom flask equipped with a condenser, nitrogen inlet adaptor, and thermocouple was added N-methylpyrrolidinone (NMP, 100 mL, Fisher Chemical certified A.C.S. grade), Joncryl® 683 acrylic polymer (a styrene-acrylic acid polymer available from Johnson Polymers having an acid number of 165 and a $M_w$ of 7000-9000, 10 g), AAOA-APEA from Example 2 (1 g, 2.8 mmol), and dicyclohexylcarbodiimide (DCC, 0.39 mL, 2.8 mmol, available from Aldrich). The solution was then heated to 85 - 95° C. and allowed to stir over two days. After this time, the reaction mixture was allowed to cool to room temperature and the product was precipitated by adding the mixture to a solution of HCL (15 mL) and DI water (750 mL). The crude polymeric dispersant was then filtered and washed with DI water (2×300 mL), yielding a polymeric dispersant comprising a polymeric group and an organic chromophore group (AAOA-APEA-J683) as a wet cake (29.4% wt. percent solids).

Example 44

A polymeric dispersant was prepared using the procedure described in Example 43, with the exception that AmDMQA from Example 7 (1 g, 2.9 mmol) was used instead of AAOA-APEA, resulting in the formation of polymeric dispersant comprising a polymeric group and an organic chromophore group (AmDMQA-J683).

Examples 45-47 and Comparative Examples 12-14

The following examples demonstrate improved properties of an inkjet ink composition of the present invention, comprising a pigment and a polymeric dispersant that comprises a polymeric group and an organic chromophore group.

Pigment dispersions were prepared using Method 2 above. Specific pigments and dispersants used for each example are shown in Table 5 below.

TABLE 5

| Example # | Pigment | Dispersant | Method | Particle size |
|---|---|---|---|---|
| 45 | PY 74 | AAOA-APEA-J683 (Ex 43) | 2 | 0.139 |
| Comp Ex 12 | PY 74 | J683 | 2 | 0.1097 |
| 46 | PR 122 | AmDMQA-J683 (Ex 44) | 2 | 0.0925 |
| Comp Ex 13 | PR 122 | J683 | 2 | 0.0799 |
| 47 | PB 15:4 | AmDMQA-J683 (Ex 44) | 2 | 0.0989 |
| Comp Ex 14 | PB 15:4 | J683 | 2 | 0.0977 |

Thermal stability trials were conducted at 70° C. for three separate formulations of each example: the neat dispersion at 4% pigment, the dispersion at 4% pigment with 10% 1,2-hexanediol (1,2HD), and the dispersion at 4% pigment with 10% tetraethylene glycol monobutyl ether (TEGMBE). Particle size growth was monitored using a UPA Microtrac laser scattering equipment. A dispersion was considered stable when a particle size increase of <20% was observed compared to the initial particle size while a dispersion was considered unstable when a particle size increase >20% was observed. Results for each dispersion are shown in Table 6 below.

TABLE 6

| Example # | Neat | 10% 1,2-HD | 10% TEGMBE |
|---|---|---|---|
| 45 | stable week 6 | unstable week 2 | stable week 6 |
| Comp Ex 12 | unstable week 1 | unstable week 1 | unstable week 1 |
| 46 | stable week 6 | unstable week 2 | stable week 6 |
| Comp Ex 13 | unstable week 1 | unstable week 1 | unstable week 1 |
| 47 | stable week 6 | stable week 6 | stable week 6 |
| Comp Ex 14 | unstable week 4 | unstable week 6 | unstable week 6 |

As the results show, pigment dispersions prepared using a polymeric dispersant comprising a polymeric group and an organic chromophore group (Examples 45-47) exhibited improved heat-aging stabilities (70° C.) compared to pigment dispersion comprising the same pigments and a polymeric dispersant without an organic chromophore group (Comparative Examples 12-14). Surprisingly, this was found whether the organic chromophore group was the same as the organic chromophore group of the colorant of the pigment (Example 45 and Example 46) or whether they were different groups (Example 47).

Thus, it has surprisingly been found that improved properties result using a polymeric dispersant comprising an attached organic chromophore group. Based on this data, it would be expected that the dispersions of Examples 45-47 could be used as an inkjet ink composition of the present invention.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An inkjet ink composition comprising:
   a) a liquid vehicle;
   b) a pigment comprising a colorant having the formula A-(B)$_x$; and
   c) a polymeric dispersant comprising a polymeric group and at least one group having the formula -LG-A'-(B)$_y$-(C)$_z$, wherein LG is a linking group, the polymeric dispersant further comprising at least one pendant group attached to the polymeric group, wherein the pendant group comprises a group having the formula -NH-ALK2, wherein ALK2 is a $C_1$-$C_{12}$ alkyl group;
   wherein A and A' are organic chromophore groups; B, which can be the same or different on the pigment when x>1 or the same or different on the polymeric dispersant when y>1, is a substituent on A and A'; C, which can be the same or different when z>1, is a substituent on A' and is different than B; x, y and z are 0, 1, 2, 3, or 4; and y is less than or equal to x; and wherein A and A' are the same and the substituents on A and A' are different.

2. An inkjet ink composition comprising:
a) a liquid vehicle;
b) a pigment comprising a colorant having the formula A-(B)$_x$; and
c) a polymeric dispersant comprising a polymeric group and at least one group having the formula -A'-(B)$_y$(C)$_z$,
wherein A and A' are organic chromophore groups; B, which can be the same or different on the pigment when x>1 or the same or different on the polymeric dispersant when y >1, is a substituent on A and A'; C, which can be the same or different when z>1, is a substituent on A' and is different than B; x, y and z are 0, 1, 2, 3, or 4; and y is less than or equal to x; and
wherein A and A' are the same and the substituents on A and A' are different and the pigment is a cyan pigment, and wherein the colorant is a phthalocyaninyl and wherein the at least one group of the polymeric dispersant is a phthalocyaninylene.

3. An inkjet ink composition comprising:
a) a liquid vehicle;
b) a pigment comprising a colorant having the formula A-(B)$_x$; and
c) a polymeric dispersant comprising a polymeric group and at least one group having the formula -A'-(B)$_y$(C)$_z$,
wherein A and A' are organic chromophore groups; B, which can be the same or different on the pigment when x>1 or the same or different on the polymeric dispersant when y >1, is a substituent on A and A'; C, which can be the same or different when z>1, is a substituent on A' and is different than B; x, y and z are 0, 1, 2, 3, or 4; and y is less than or equal to x; and
wherein A and A' are the same and the substituents on A and A' are different and the pigment is a cyan pigment, and wherein the colorant is an indanthrone.

4. An inkjet ink composition comprising:
a) a liquid vehicle;
b) a pigment comprising a colorant having the formula A-(B)$_x$; and
c) a polymeric dispersant comprising a polymeric group and at least one group having the formula -A'-(B)$_y$(C)$_z$,
wherein A and A' are organic chromophore groups; B, which can be the same or different on the pigment when x>1 or the same or different on the polymeric dispersant when y>1, is a substituent on A and A'; C, which can be the same or different when z>1, is a substituent on A' and is different than B; x, y and z are 0, 1, 2, 3, or 4; and y is less than or equal to x; and
wherein A and A' are the same and the substituents on A and A' are different and the pigment is a yellow pigment.

5. The inkjet ink composition of claim 4, wherein the colorant is a symmetrical or unsymmetrical quinolonoquinolone.

6. The inkjet ink composition of claim 5, wherein B is a halogen and y is 0.

7. The inkjet ink composition of claim 5, wherein x is 1 or 2.

8. The inkjet ink composition of claim 4, wherein the colorant is 3-fluoro -quinolonoquinolone, 2-fluoro-quinolonoquinolone, or 3-chloro-quinolonoquinolone.

9. The inkjet ink composition of claim 4, wherein the colorant is a quinolonoquinolonyl and wherein the at one group of the polymeric dispersant is a quinolonoquinolonylene.

10. The inkjet ink composition of claim 4, wherein the colorant is an azo colorant.

11. The inkjet ink composition of claim 10, wherein the colorant is a 2-(phenylazo)-N-(phenyl) -3-oxobutanamidyl and wherein the at least One group of the polymeric dispersant is a 2-(phenyleneazo)-N-(phenylene)-3-oxobutanamide.

12. The inkjet ink composition of claim 10, wherein B is a methoxy group, x is 3, y is 1, and z is 0.

13. The inkjet ink composition of claim 4, wherein the colorant is an isoindolone.

* * * * *